(12) United States Patent
Kennedy

(10) Patent No.: US 7,760,187 B2
(45) Date of Patent: Jul. 20, 2010

(54) VISUAL EXPANDER

(75) Inventor: Peter Kennedy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 782 days.

(21) Appl. No.: 10/927,925

(22) Filed: Aug. 26, 2004

(65) Prior Publication Data

US 2006/0022955 A1 Feb. 2, 2006

Related U.S. Application Data

(60) Provisional application No. 60/592,483, filed on Jul. 30, 2004.

(51) Int. Cl.
*G06F 3/041* (2006.01)
(52) U.S. Cl. ........................ 345/173; 715/863
(58) Field of Classification Search .................. 345/173, 345/619; 715/863
See application file for complete search history.

(56) References Cited

U.S. PATENT DOCUMENTS

| 5,319,386 | A | * | 6/1994 | Gunn et al. | 345/173 |
|---|---|---|---|---|---|
| 5,589,856 | A | * | 12/1996 | Stein et al. | 345/173 |
| 5,736,974 | A | | 4/1998 | Selker | 345/146 |
| 5,910,800 | A | * | 6/1999 | Shields et al. | 715/711 |
| 6,049,326 | A | | 4/2000 | Beyda et al. | 345/157 |
| 6,073,036 | A | * | 6/2000 | Heikkinen et al. | 455/550.1 |
| 6,411,283 | B1 | | 6/2002 | Murphy | 345/173 |
| 7,075,512 | B1 | | 7/2006 | Fabre et al. | 345/156 |
| 2001/0040587 | A1 | | 11/2001 | Scheck | 345/676 |
| 2002/0067346 | A1 | | 6/2002 | Mouton | 345/173 |
| 2002/0080123 | A1 | | 6/2002 | Kennedy et al. | |
| 2002/0180763 | A1 | * | 12/2002 | Kung | 345/660 |
| 2003/0063073 | A1 | | 4/2003 | Geaghan et al. | 345/173 |
| 2004/0135818 | A1 | * | 7/2004 | Thomson et al. | 345/823 |
| 2004/0155888 | A1 | * | 8/2004 | Padgitt et al. | 345/619 |
| 2004/0160419 | A1 | | 8/2004 | Padgitt | 345/173 |
| 2004/0196267 | A1 | | 10/2004 | Kawai et al. | 345/173 |
| 2005/0024341 | A1 | * | 2/2005 | Gillespie et al. | 345/173 |
| 2005/0093826 | A1 | | 5/2005 | Huh | 345/168 |
| 2005/0190147 | A1 | | 9/2005 | Kim | |
| 2006/0001654 | A1 | * | 1/2006 | Smits | 345/176 |
| 2006/0132460 | A1 | | 6/2006 | Kolmykov-Zotov et al. | 345/173 |
| 2006/0274051 | A1 | | 12/2006 | Longe et al. | 345/173 |

FOREIGN PATENT DOCUMENTS

EP  0 795 811 A1  9/1997

(Continued)

OTHER PUBLICATIONS

U.S. Appl. No. 10/840,862 entitled "Multipoint Touchscreen", filed May 26, 2004.

(Continued)

*Primary Examiner*—Amr Awad
*Assistant Examiner*—Yong Sim
(74) *Attorney, Agent, or Firm*—Morgan, Lewis & Bockius LLP

(57) ABSTRACT

A computer implemented method for a touchscreen display is disclosed. The method includes presenting graphical information on the touchscreen display. The method further includes detecting a touch over the touchscreen display. The method also includes expanding an area of the touch screen display proximate the location of the touch.

15 Claims, 19 Drawing Sheets

FOREIGN PATENT DOCUMENTS

| | | |
|---|---|---|
| EP | 1 674 976 A2 | 6/2006 |
| GB | 2 351 639 A | 1/2001 |
| WO | WO 00/75766 | 12/2000 |
| WO | WO 01/46790 A2 * | 6/2001 |
| WO | WO 2004/051392 A2 | 6/2004 |
| WO | WO 2006/020304 A2 | 2/2006 |
| WO | WO 2006/020305 | 2/2006 |

OTHER PUBLICATIONS

U.S. Appl. No. 11/038,590 entitled "Mode-based graphical user interfaces for touch sensitive input devices", filed Jan. 18, 2005.

U.S. Appl. No. 10/903,964 entitled "Gestures for touch sensitive input devices", filed Jul. 30, 2004.

U.S. Appl. No. 10/789,676 entitled "Shape detecting input devices", filed Feb. 27, 2004.

U.S. Appl. No. 10/654,108 entitled "Ambidextrous Mouse", filed Sep. 2, 2003.

U.S. Appl. No. 11/048,264 entitled "Gestures for touch sensitive input devices", filed Jan. 31, 2005.

"Visual Disabilities", http://depts.stcc.edu/ods/ACCESS/bpvisual.htm, downloaded Oct. 25, 2005.

"Lunar Screen Magnifier and Lunar Plus Enhanced Screen Magnifier", www.dolphincomputeraccess.com/products/lunar.htm, downloaded Oct. 25, 2005.

"Ai Squared Products", http://www.aisquared.com/Products/index.cfm, downloaded Oct. 25, 2005.

"Ali Squared Products—XoomText Magnifier", http://www.aisquared.com/Products/zoomtextmag/index.cfm, downloaded Oct. 26, 2005.

International Search Report and Written Opinion for International Application No. PCT/US2007/077645, mailed Jan. 10, 2008.

International Search Report and Written Opinion for International Application No. PCT/US2007/082486, mailed Jul. 18, 2008. (Related case).

Office Action dated May 13, 2009, for related U.S. Appl. No. 11/553,436.

Miller, D., "Personal/Java Application Environment," Jun. 8, 1999, 12 pages http://java.sun.com/products/personaljava/touchable/.

Office Action dated Oct. 15, 2009, received in European Patent Application No. 07 854 411.1, which corresponds to U.S. Appl. No. 11/923,453.

Office Action dated Oct. 30, 2009, received in U.S. Appl. No. 11/553,436.

Rekimoto, J. et al., "PreSense: Interaction Techniques for Finger Sensing Input Devices," UIST 2003, Vancouver, BC, Canada, © 2003 ACM, vol. 5, Issue 2, pp. 203-212.

* cited by examiner

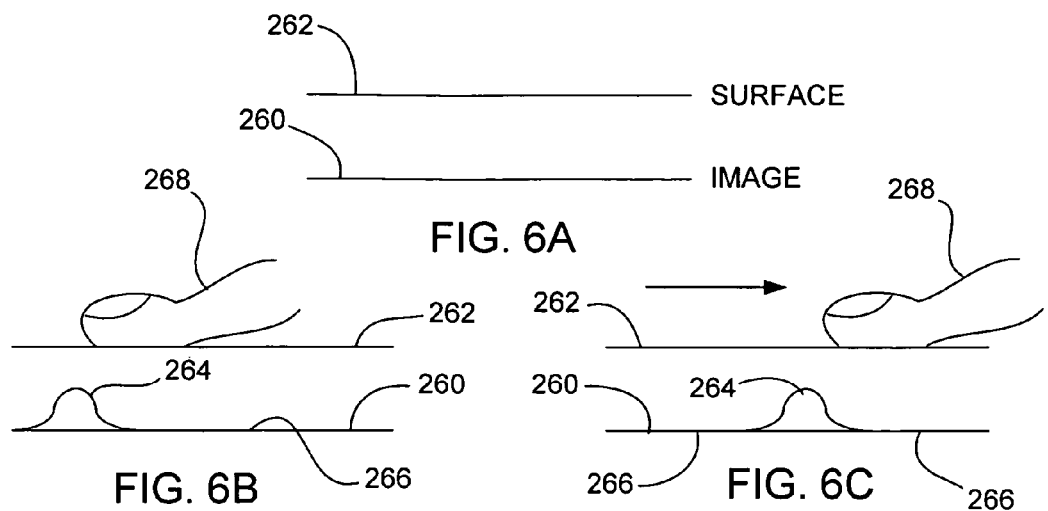
FIG. 6A
FIG. 6B
FIG. 6C
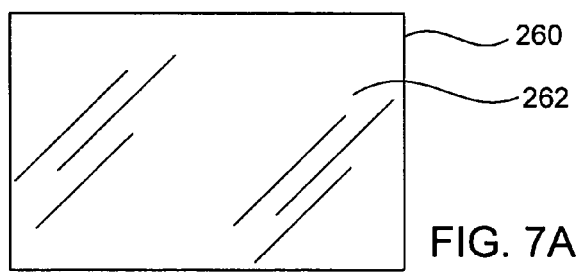
FIG. 7A
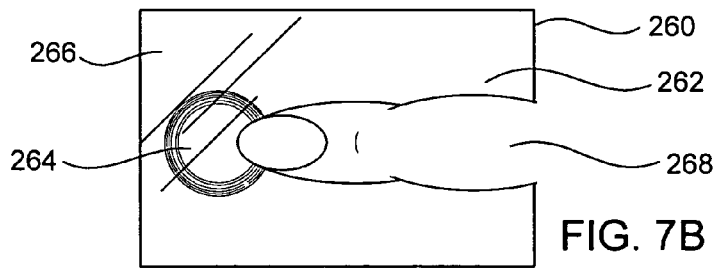
FIG. 7B
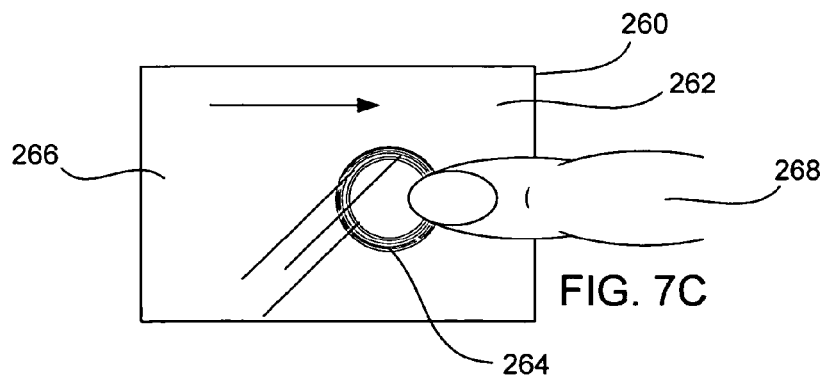
FIG. 7C

VISUAL EXPANDER

CROSS-REFERENCE TO RELATED APPLICATIONS

This application is claims priority to U.S. Provisional Patent Application No. 60/592,483, filed Jul. 30, 2004, entitled "TOUCH SENSITIVE TECHNIQUES AND INPUT DEVICES," which is hereby incorporated herein by reference.

BACKGROUND OF THE INVENTION

1. Field of the Invention

The present invention relates generally to methods and systems associated with touch screen displays. More particularly, the present invention relates to expanding graphical and sensitive portions of a touchscreen display.

2. Description of the Related Art

There exist today many styles of input devices for performing operations in a computer system. The operations generally correspond to moving a cursor and/or making selections on a display screen. By way of example, the input devices may include buttons or keys, mice, trackballs, touch pads, joy sticks, touch screens and the like. Each of these devices has advantages and disadvantages that are taken into account when designing or configuring a computer system.

Touch screens, in particular, are becoming increasingly popular because of their ease and versatility of operation as well as to their declining price. Touch screens allow a user to make selections and move a cursor by simply touching the display screen via a finger or stylus. For example, a user may make a selection by pointing directly to a graphical object displayed on the display screen. The graphical object may for example correspond to an on-screen button for performing specific actions in the computer system. In general, the touch screen recognizes the touch and position of the touch on the display screen and the computer system interprets the touch and thereafter performs an action based on the touch event. There are several types of touch screen technologies including resistive, capacitive, infrared and surface acoustic wave.

While touchscreens generally work well, they are difficult to use when features such as buttons, web page links, or UI controls presented on the touch screen display are too small for finger activation, i.e., the finger is too large relative to the button, link or UI controls. Even if these features could be enlarged to meet minimum human factors requirements, they would adversely reduce the amount of space available for displaying other information to the user. In fact, in most cases the features are made small due to the limited amount of screen space (especially in handheld devices). Furthermore, the features typically do not provide the user with any feedback indicating that a finger is located on the feature. This may make it difficult to determine what feature is being selected. As a result, the user may incorrectly select a feature. Moreover, once the size of the features are set, they typically cannot be changed. For example, in web browsing users have no control over the size of the link or button presented by a website.

In most small touchscreens such as those used in personal digital assistants, styli are used to help pin point areas for selection and to perform gestures such as those used to enter characters or symbols. While this generally provides a solution to activating small features, the styli has its own drawbacks. For example, the user still has to manipulate the stylus over the feature. This may be difficult for some users such as those who are visually impaired or those with limited coordination. In addition, the stylus can be lost and it can be aesthetically unpleasing. For example, the stylus is typically separate from the computing device in which it is used and therefore the stylus can be easily misplaced by the user. With regards to being aesthetically unpleasing, the computing device typically includes a receptacle, which receives the stylus and which produces unwanted breaks and cracks in the external surface of the computing device. Moreover, the stylus is less intuitive than using a finger.

Recently, several software products have come on the market that help visually impaired individuals see objects displayed on the screen. These software products are typically implemented in traditional computer systems such as those that include a desktop and a CRT monitor. The software products typically include magnifiers that magnify a portion of the screen. The magnifiers may for example be implemented with a virtual magnifying glass. The virtual magnifying glass magnifies the GUI in the area of the magnifying glass, i.e. similarly to moving a magnifying glass over a printed piece of paper. The magnifying glass allows the user to traverse through the GUI so that the user can read small text. In most cases, the virtual magnifying glass is controlled by moving a cursor such as for example via a remote mouse, or trackball. While virtual magnifying glasses work well, they are limited. For example, they typically do not allow features to be manipulated or selected inside the magnified area. Furthermore, they may not allow text editing therein.

Some operating systems such as Apple Computer's OS-X are designed to magnify a dock including the icons contained therein when the cursor is moved over the docks icons. While this works well, the feature has no control over the content presented on the remainder of the screen, i.e., the remaining portions of the screen do not magnify when the cursor is positioned thereover. Furthermore, this particular feature only works on the main system page. It does not work in programs or applications or even web pages.

SUMMARY OF THE INVENTION

The invention relates, in one embodiment, to a computer implemented method for a touchscreen display. The method includes presenting graphical information on the touchscreen display. The method further includes detecting a touch over the touchscreen display. The method also includes expanding an area of the touch screen display proximate the location of the touch.

The invention relates, in another embodiment, to a computer implemented method. The method includes presenting a graphical user interface (GUI). the method also includes sensing an object over the graphical user interface. The method further includes visually expanding an area of GUI near the sensed object. The method additionally includes if the expanded area includes a selectable feature, performing an action associated with the feature when the feature is selected. The method further includes if the sensed object is moving over the GUI, moving the expanded area in accordance with the moving object. Moreover, the method includes if the object is no longer sensed, maintaining the expansion of the expanded area in the last sensed location for a predetermined amount of time.

The invention relates, in another embodiment, to a computer implemented method. The method includes displaying graphical information. The method also includes detecting an object over the graphical information. The method further includes visually expanding portions of the graphical information in close proximity and underneath the detected object.

BRIEF DESCRIPTION OF THE DRAWINGS

The invention will be readily understood by the following detailed description in conjunction with the accompanying drawings, wherein like reference numerals designate like structural elements, and in which:

FIGS. 6A-6C are side views illustrating moving expansion, in accordance with one embodiment of the present invention.

FIGS. 7A-7C are top views illustrating moving expansion, in accordance with one embodiment of the present invention.

DETAILED DESCRIPTION OF THE INVENTION

Embodiments of the invention are discussed below with reference to FIGS. 1-15. However, those skilled in the art will readily appreciate that the detailed description given herein with respect to these figures is for explanatory purposes as the invention extends beyond these limited embodiments.

Figure 1:
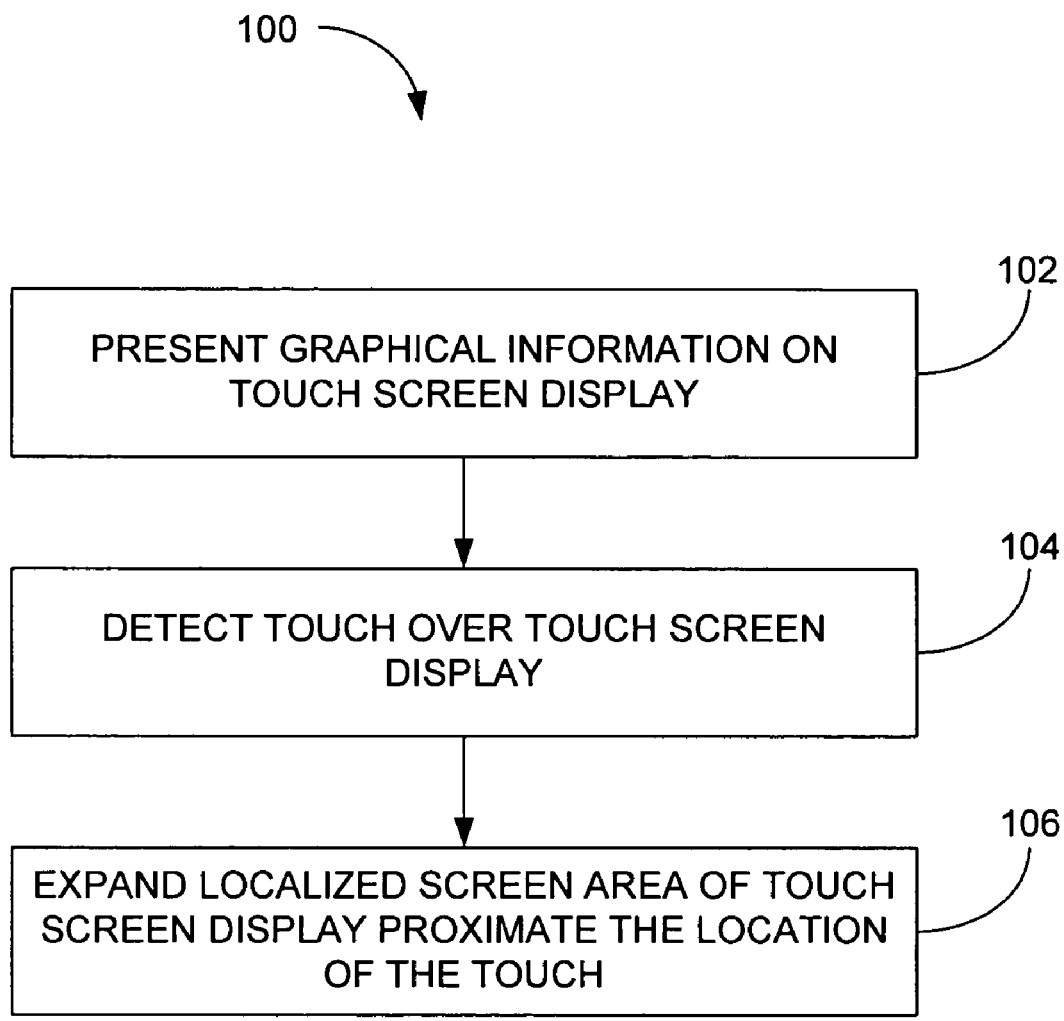
FIG. 1 is an expansion method, in accordance with one embodiment of the present invention.

FIG. 1 is an expansion method, in accordance with one embodiment of the present invention. The method may be implemented on computing devices having a touchscreen display. Touchscreen displays generally consist of a display and a substantially transparent touchscreen that is laid over the display. The display is configured to present graphical information, and the touchscreen is configured to receive touch inputs. The touchscreen may for example be used to perform tracking make selections, issue commands, and controlling interface elements with respect to the graphical information on the display. By way of example, the computing devices may include desktops, laptops, tablets, and handheld computers. The computer devices may also correspond to cell phones, PDAs, media players, consumer electronic devices, and/or the like.

The method generally begins at block 102 where graphical information is presented on the touchscreen display. This is typically accomplished with the display portion of the touchscreen display. In most cases the graphical information fills the entire display screen, although in some cases it may only fill a portion of the display screen. The graphical information may for example be a graphical user interface (GUI). As is generally well known, the GUI represents, programs, files and operational options with graphical images. The graphical images may include windows, fields, dialog boxes, menus, icons, buttons, cursors, scroll bars, etc. During operation, the user can select and activate various graphical images in order to initiate functions and tasks associated therewith. By way of example, a user may select a button that opens, closes, minimizes, or maximizes a window, an icon that launches a particular program or a link that opens a particular web page. In addition, the user may actuate user interface controls such as a scroll bar to perform scrolling in the GUI. The GUI can additionally or alternatively display non interactive text and graphics Following block 102, the method proceeds to block 104 where a touch is detected over the touchscreen display. This is generally accomplished with the touchscreen portion of the touchscreen display. In most cases, the touch screen recognizes one or more touches, as well as the position and magnitude of touches on its touch sensitive surface.

Following block 104, the method proceeds to block 106 where an area or portion of the touchscreen display is expanded proximate the location of the touch. Any portion of the touchscreen display can be expanded. The step of expanding may include visually expanding a portion of the presented graphical information in the region of the touch relative to the remaining portions of the presented graphical information outside the region of the touch. The step of expanding may also include expanding the touch sensitive portions associated with the expanded visual portion. The sensitive portion are points or regions of the touchscreen that are linked to particular points or regions of the graphical information as for example, the touch sensitive region above a graphical button. In most cases, the sensitive portions are scaled with the visually expanded portions. That is, the step of expanding includes scaling the input sensitivity with the expanded visual portions of the graphical information. The scaling may be proportional since the sensitive portions are typically a little larger than the visual portions (the visual portion and the sensitive portion aren't exactly a 1:1 relationship). By way of example, if the visual portion grows by a factor of 3 then the sensitive portion grows by a factor of 3.

During expansion, the visual and/or sensitive portions of the touchscreen display may be magnified and/or increased in size compared to the remaining visual and/or sensitive portions of the touchscreen display. By way of example, the visual portion may grow from its original size to an enlarged size (e.g., from 4 mm to 8 mm) and be magnified from its original state to a magnified state (e.g., from 1× to 2×). Although the expanded portions are enlarged and magnified, in most cases, the expanded portion maintains the same aspect ratio and shape that it has in the unexpanded state. As should be appreciated, expansion may be somewhat analogous to zooming.

The area that is expanded may be the area underneath the touch. Alternatively, the area that is expanded may be offset from the touch such as for example above, below or to the sides of the touch. This may allow the user to more clearly view the expanded area.

The size, magnification and shape of the expanded area may be widely varied. By way of example, and not by way of limitation, the expanded area may have an area of between about 100 mm$^2$ and about 400 mm$^2$, and a height and width between about 10 mm to about 20 mm. Furthermore, the expanded portions may be magnified between greater than 1 time to over a thousand times, more particularly between about 2× to about 100×, and even more particularly, the between about 2× and about 20×. Moreover, the expanded area may be formed from various shapes including but not limited to circles, ovals, squares, rectangles, triangles, and the like. Other shapes such as symbols, logos, characters may also be used.

In one embodiment, the expanded portion of the graphical information is raised relative to the non expanded portion of the graphical information. For example, the expanded portion may appear to protrude away from the non expanded portions. This is typically done graphically as both the expanded and non expanded portions are typically produced in the same plane. By way of example, shading principals may be used to make the expanded portion appear to protrude away from the non expanded portions.

In some cases, the expanded portion includes a substantially planar plateau region and a substantially sloped transition region. The planar plateau region provides a planar surface for displaying the targeted graphical information and the transition region provides a gradient of growth between the plateau region and the non expanded portion of the graphical information. The transition region, which is the edge of the plateau compacts or compresses the graphical information located between the plateau and the non expanded portion of the graphical information. For example, the graphical information contained in the transition region have compacted or compressed magnification levels (this may distort the graphical information contained therein) In alternative implementations, the plateau may be rounded rather than being planar or the expanded portion may be one large transition region without having a plateau. In either case, the expanded portion may look like a rounded pimple or bump.

The expanded portion may be a localized area, which can be any portion of the graphical information. The localized area may include any portion of the graphical information including but not limited to background (e.g., wall paper), windows, fields, text, dialog boxes, menus, icons, buttons, cursors, UI controls or any combination thereof.

The expanded portion may also be linked to a particular object of the graphical information. For example, a particular window, field, dialog box, menu, icon, button, tool bar, user interface element (e.g., scroll bar, scroll wheel, slider bar, dial), control box, footnote and the like. In some case, the entire object is expanded. For example, when the finger is placed over a window, the entire window is expanded. In other cases, only a portion of the object is expanded. For example, when the finger is placed over a tool bar, only the selectable items are expanded. As should be appreciated, these objects may need to be expanded so that they can be easily used by a human hand.

The time when expansion takes place can be widely varied. In one embodiment, expansion is activated immediately after the touch is detected. In another embodiment, expansion is activated after the touch is detected for a predetermined amount of time. In cases such as this, the user may have to hover their finger over the area desired to be expanded for the predetermined amount of time in order to initiate the expansion. By way of example, the dwell time may be between about 0.5 to about 5 seconds, and more particularly about 1 second. This embodiment may be employed to prevent inadvertent expansion. That is, the time delay may be used to avoid implementing expansion with casual contact not intended for expansion.

Once expansion is activated, the speed or rate at which the expanded area expands may be widely varied. The growth can happen quickly or slowly. In one embodiment, the expanded area grows from its normal state to the expanded state almost instantaneously. In another embodiment, the expanded area grows over some predetermined amount of time, i.e., the area expands gradually over time. The rate may be preset or it may be based on some external factor. For example, the rate of growth may be based on the touch pressure, i.e., the greater the touch pressure, the greater the rate of change. Alternatively, the rate of growth may be based on multiple taps, i.e., each tap causes incremental expansion.

The manner in which expansion is implemented may also be widely varied. In one embodiment, the amount of expansion (size, magnification, etc) is preset. The preset amount may be fixed or it may be adjustable. For example, a user may adjust the characteristics of expansion via a control menu. In another embodiment, the amount of expansion is based on some external factor. In one particular case, the amount of expansion is based on the amount of touch pressure. For example, the greater the pressure the greater the magnification or overall size of the localized area (or vice versa). In another case, the amount of expansion may be based on the location of the touch relative to the graphical information (e.g., region sensitivity). For example, a first located object of the graphical information may be magnified 2× and a second located object of the graphical information may be magnified 16×. In yet another embodiment, the expanded portion may be configured to follow the touch as the touch is moved across the touchscreen display. For example, the location of the expanded portion changes in accordance with the location of the touch, i.e., it mirrors the position of the touch.

Although not shown in FIG. 1, the method may include additional steps such as reverting back to a non expanded state when the touch is no longer detected. In one embodiment, the expansion is deactivated immediately after the touch is no longer detected thereby causing the expanded portion to revert back to its normal state. In another embodiment, expansion is deactivated after a predetermined amount of time, i.e., there is a lag time. The lag time may be preset (e.g., user settable) or it may be based on external factors such as the amount of information located in the expanded area and human factors such as how long the user would take to read or grasp this particular amount of information. The lag time may allow the user to establish if the expanded area is the desired target. If its not the desired target, the user can move their finger to a new target. If it is the desired target, the user may perform additionally steps within the expanded area. By way of example, and not by way of limitation the lag time may be between about 0.5 to about 5 seconds, and more particularly 1 second.

The speed or rate at which the expanded area reverts back to its normal state may be widely varied. The atrophy can happen quickly or slowly. In one embodiment, the expanded area atrophies from its expanded state to the normal state almost instantaneously. In another embodiment, the expanded area atrophies over some predetermined amount of time, i.e., the area atrophies gradually over time.

The method may also include receiving inputs within the expanded area. The inputs may for example be a selection input that is implemented with tapping or increased touch pressure. Alternatively, the input may be a gestural input or a data entry input. By way of example, in an expanded state, a virtual scroll wheel may be capable of being manipulated by a swirling finger gesture or text may be entered into an expanded document. In all of these cases, the expansion may be designed to expand a feature or group of features (such as buttons) so that they are adequately sized for finger manipulation.

Moreover, the method may include detecting a second touch over the touchscreen display and expanding a second area of the touchscreen display proximate to the location of the second touch. In one implementation, the second touch is detected at the same time as the first touch such that the first and second expanded areas are expanded simultaneously (as for example using a multipoint touchscreen). In another implementation, the second touch is detected after the completion of the first touch. In cases such as this, if the second touch occurs during the lag time of the first expansion, then the first expansion may smoothly transition to the second expansion (e.g., as the first gradually shrinks, the second gradually expands). Alternatively, a second touch in the region of the expanded area may cause further expansion. For example, if the expanded portion includes a plurality of features, a second touch may be used to further expand one or more of the features. Thereafter, the feature may be selected for example by increasing the touch pressure or initiating a third touch such as a tap.

Alternatively, expansion may not be implemented if more than one touch is detected at the same time, i.e., simultaneously. This "double touch" could be considered a null input for the purposes of expansion.

The methods mentioned above may be implemented with software or hardware, or a combination of hardware and software. In one embodiment, the method is implemented by an operating system. As such, the method may be implemented during any program or application running in conjunction with the operating system. That is, expansion can occur in any program or application. By way of example, the operating system may correspond to Mac OS, OS/2, DOS, Unix, Linux, Palm OS, and the like. The operating system can also be a special purpose operating system, such as may be used for limited purpose appliance-type computing devices. Operating systems are generally well known and will not be described in greater detail.

Figure 2:
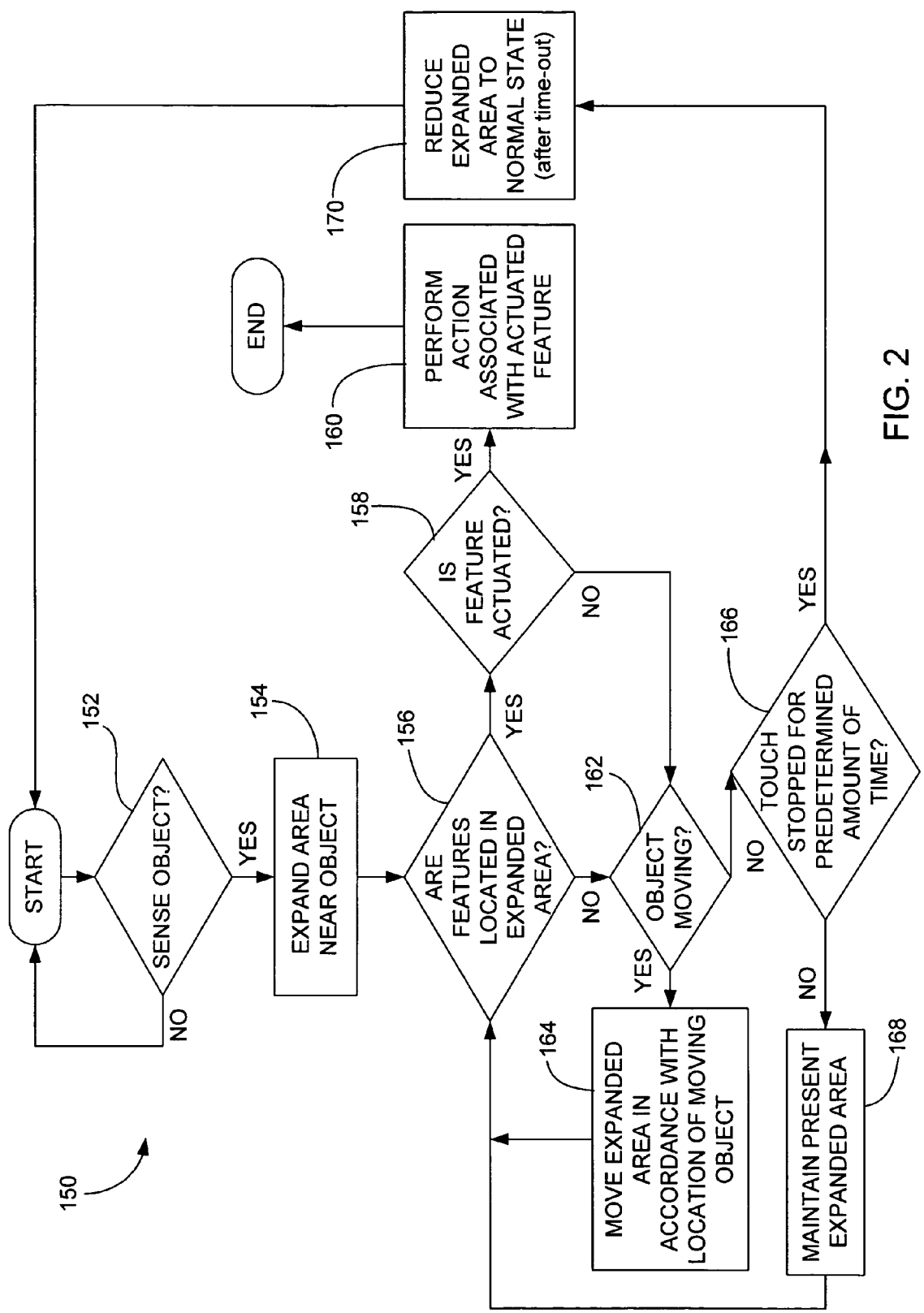
FIG. 2 is an expansion method, in accordance with one embodiment of the present invention.

FIG. 2 is a touchscreen display method 150, in accordance with one embodiment of the present invention. The method begins at block 152 where object sensing is performed via the touchscreen of the touchscreen display. The object may for example be a finger or palm of a user's hand. Alternatively, the object may be a stylus. In most cases, the sensing is performed when the object touches the touch sensitive surface of the touchscreen. In other cases, the object may be sensed when the object is placed over, but not in contact with the touchscreen.

If an object is sensed, the method proceeds to block 154 where the area near the sensed object is expanded. In particular, a portion of the GUI in the vicinity of the object is visually expanded relative to the remaining portions of the GUI. The touch sensitivity associated with the GUI is also expanded. The expanded area may be expanded immediately or it may appear to gradually grow until it reaches its final shape size, elevation, etc.

In most cases, the visually expanded portion is made to appear like it is protruding out of the image plane. The protruding effect is typically accomplished through graphics such as shading or other similar means. The protruding effect may be implemented in a localized area of the GUI or it may be implemented at a particular GUI image such as a control box, tool bar, user interface element, and/or the like.

In one embodiment, the expanded portion includes a plateau region and a transition region. During expansion, the target area contained within the plateau region increases in size and magnification. At the same time, the transition region compresses the GUI between the target area contained in the plateau region and the remaining unexpanded portions of the GUI. As a result, the plateau region appears to raise above the remaining portions of the GUI.

Following block 154, the method proceeds to block 156 where a determination is made as to whether or not features are located within the expanded area. The features may be buttons, web links, icons, user interface elements, data entry regions and/or the like.

If a feature is located within the expanded area, the method proceeds to block 158 where a determination is made as to whether or not the feature is actuated (e.g., selected, activated, etc.). The determination may include monitoring the sensed object and associating or linking a particular feature to the sensed object. The association or link may be made by ranking the relevance of the sensed object to the feature. The ranking may for example include producing a figure of merit, and whichever feature has the highest figure of merit, giving it sole access to the events occurring with the sensed object. By way of example, the ranking may include calculating the centroid of a touch and its proximity to the feature.

If the feature is a web link, button or icon, the feature may be actuated via a change in touch pressure, a time based hover, or a tap. With regards to touch pressure, a first touch pressure may initiate expansion and a second touch pressure may initiate a select command. The first and second touch pressure may be made within a single touch (continuous contact) or they may be separate events. This particular implementation may be based on the principle that when a finger lightly touches a planer surface, then a relatively small contact area may be detected. When the finger is pressed more forcefully against the surface, then a relatively large contact area may be detected. With regards to a time based hover, a select command may be generated when the finger is positioned over a particular selectable feature for a predetermined amount of time. With regards to tapping, a select command is generated when the user taps their finger on the feature while the feature is in the expanded state. The select command may be generated at touchdown or lift off. Furthermore, the tap may be a single tap or a double tap.

If the feature is a user interface element, the feature may be actuated via a gesture. See for example, U.S. patent application Ser. No. 10/903,964, titled "GESTURES FOR TOUCH SENSITIVE INPUT DEVICES," and filed on Jul. 30, 2004, which is herein incorporated by reference. If the feature is a data entry feature, the feature may be actuated by entering data as for example through the use of a cursor or keyboard (e.g., word processing).

In cases where the expanded area includes a plurality of features, an intermediate block may be included between blocks 156 and 158. The intermediate block includes providing feedback as to which feature is the most likely selectable feature based on some predefined criteria (the feedback indicates where a system thinks the user is targeting). The criteria may for example be based on the location of the sensed object relative the location of the various features. For example, the feature located closest to the object may indicate that it is the most likely candidate for selection. In essence, the feedback is a confirmation of correct targeting before selection. If the user does not get the right feedback, the user has the option of moving their finger to another location. The feedback may be visual or auditory. By way of example, visual feedback may include modifying the feature such as changing its color, position, size, shape, symbol, etc., and auditory indication may include providing sounds associated with the feature.

Once the feature is actuated, the method proceeds to block 160 where an action associated with the feature is performed. The action may for example include launching a particular program, opening a file or document, viewing a menu, making a selection, executing instructions, generating control signals, and the like. Following the action, the method may go back to start, or it may go back to block 154 depending on whether the user provides a continuous or segmented touch.

If the feature is not actuated or if there is no feature located within the expanded area, the method proceeds to block 162 where a determination is made as to whether or not the object (finger) is moving over the touchscreen. For example, if the object is standing still or whether the object is being dragged across the touch sensitive surface of the touchscreen.

If the object is moving, the method proceeds to block 164 where the expanded area is moved in accordance with the location of the moving object. That is, the expanded area follows the motion of the object. This is generally accomplished during continuous contact. In the case of a finger, the expanded area may follow the centroid of the finger's contact area. Following block 164, the method proceeds back to block 156.

If it is determined that the object is not moving, the method proceeds to block 166 where a determination is made as whether or not the object is still sensed. If so, the method proceeds to block 168 where the present expanded area is maintained. Thereafter, the method proceeds back to block 156. If the object is not sensed, the method proceeds to block 170 where the expanded area is reduced to its normal state. The reduction may mimic the expansion, but in a reverse direction. By way of example, in embodiments where the expanded portion includes a plateau region and a transition region, the target area contained within the plateau region may be decreased in size and magnification. At the same time, the transition region may decompress the GUI between the target area contained in the plateau region and the remaining unexpanded portions of the GUI. As a result, the plateau region appears to integrate back into the remaining portions of the GUI. Furthermore, the reduction may occur immediately after the touch is not sensed or after some predetermined amount of time.

Figure 3:
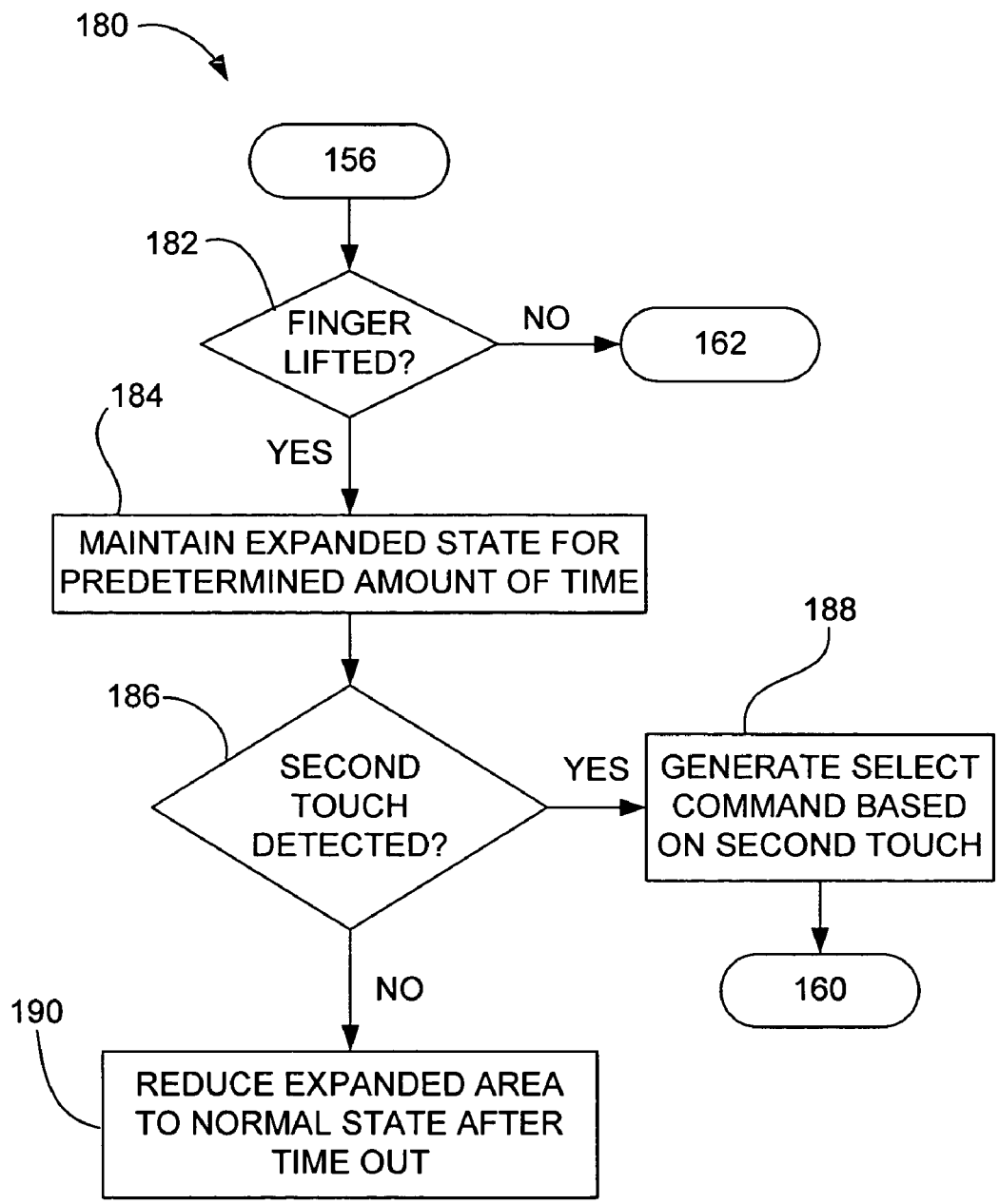
FIG. 3 is a touch based selection method, in accordance with one embodiment of the present invention.

FIG. 3 is a touch based selection method 180, in accordance with one embodiment of the present invention. The selection method 180 may for example be used in blocks 158 and 160 described in FIG. 2. The selection method generally occurs after blocks 152-156 where 1) the object is placed on a touchscreen surface and a first touch is detected by the touchscreen, and 2) the area around the touch is expanded and a determination is made as to whether or not features such as buttons or links are located in the expanded area.

The method generally begins at block 182 where a determination is made as to whether or not the finger is lifted off of the touchscreen. If not, the method proceeds for example to block 162. If so, the method proceeds to block 184 where the expanded state is maintained for a predetermined amount of time after the lift off. Thereafter, the method proceeds to block 186 where a determination is made as to whether or not a second touch is detected in the expanded area before the end of the time limit. If a second touch is detected, the method proceeds to block 188 where the second touch is associated with a feature in the expanded area and a select command associated with the feature is generated. The feature selected may for example be the feature closest to the second touch. In some cases, the select command is generated at finger lifted off (e.g., tap). In other cases, the select command is generated at placement of the second touch. Going back to block 186, if a second touch is not detected in the expanded area, the method proceeds to block 190 where the expanded area is reduced to its normal state after a time out. Block 190 may for example correspond to block 170 of FIG. 2.

Figure 4:
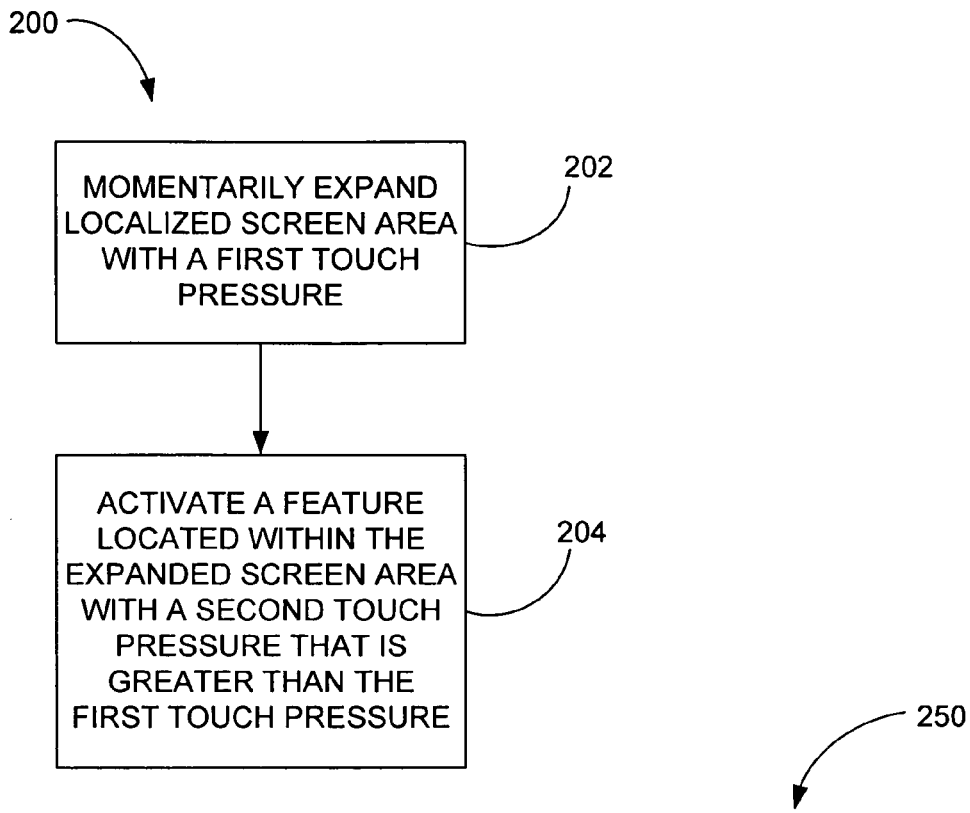
FIG. 4 is a touch based method, in accordance with another embodiment of the present invention.

FIG. 4 is a touch based method, in accordance with another embodiment of the present invention. The method includes blocks 202 and 204. In block 202, a localized screen area is momentarily expanded with a first touch pressure. The localized screen area includes a selectable feature such as a link or button. In block 204, the feature located within the expanded screen area is activated with a second touch pressure that is different than the first touch pressure. In some cases, the second touch is greater than the first touch, and in other cases, the second touch is less than the first touch. The first and second touches may be segmented contact or continuous contact. If segmented, the second touch generally needs to take place before the expanded area times out and goes back to its normal unexpanded state. If continuous contact, the second touch generally can take place at any time since the contact maintains the expanded state.

In one example of this embodiment, the user notices one or more features on the GUI and because they are small the user places their finger over the features for a predetermined amount of time in order to initiate the expansion of the features. Once expanded, the user views the features and moves their finger over the desired feature without removing their finger. Once over the desired feature and without removing their finger, the user exerts a second touch pressure that is greater than the first touch pressure used to initiate the expansion of the features. The second touch pressure activates the feature. For example, in the case of a web link, the web page associated with the web link is launched. In the case of a button, the action associated with the button is initiated.

Figure 5:
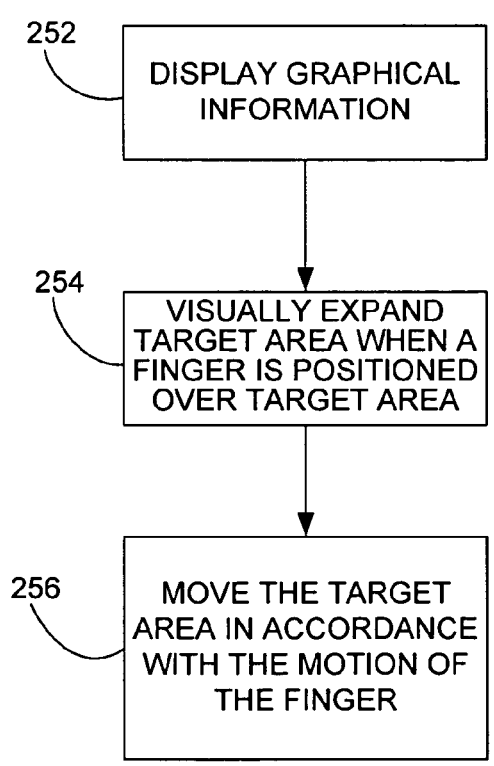
FIG. 5 is a touch based method, in accordance with one embodiment of the present invention.

FIG. 5 is a touch based method 250, in accordance with one embodiment of the present invention. The touch based method may for example be performed on a touchscreen display. The method includes blocks 252, 254 and 256. In block 252, graphical information is displayed. In block 254, a user targets an area of the graphical information and the target area is expanded when a user places their finger over the target area. In block 256, the expanded target area follows the motion of the finger as the finger is moved over the display screen. That is, the location of the target area changes with the location of the finger. In most cases, the following action occurs while the finger is sensed. Once the finger is not sensed, the expanded portion stops moving and goes back to its normal state after a time out. As should be appreciated, this method is more intuitive than using a remote input device and cursor, i.e., this is a direct action rather than a remote action.

FIGS. 6 and 7 are exemplary diagrams illustrating one embodiment of the method shown and described in FIG. 5. As shown in FIGS. 6A and 7A, a GUI 260 is displayed underneath a transparent sensing surface 262. As shown in FIGS. 6B and 7B, a targeted portion 264 of the GUI 260 is expanded relative to other portions 266 of the GUI 260 when a finger 268 is positioned over the targeted portion 264. The targeted portion 264, which is a localized region of the GUI 260, can be any portion of the GUI 260. During expansion, the targeted portion 264 is increased in size, magnified and raised up relative to the remaining portion 266 of the GUI 260. Although shown raised and out of plane in FIG. 7B, it should be noted that the expanded targeted portion 264 is actually in plane. It is only shown this way to better illustrate the protruding effect caused by expansion. The illusion of raising the targeted portion 264 may be created in one embodiment by compressing the edges of the expanded targeted portion. As shown in FIGS. 6C and 7C, as the finger 268 is moved over the GUI 260, the expanded targeted portion 264 follows the motion of the finger 268. The expanded targeted portion 264 thereby informs the user to the location of the touch (similar to a cursor).

Figure 8:
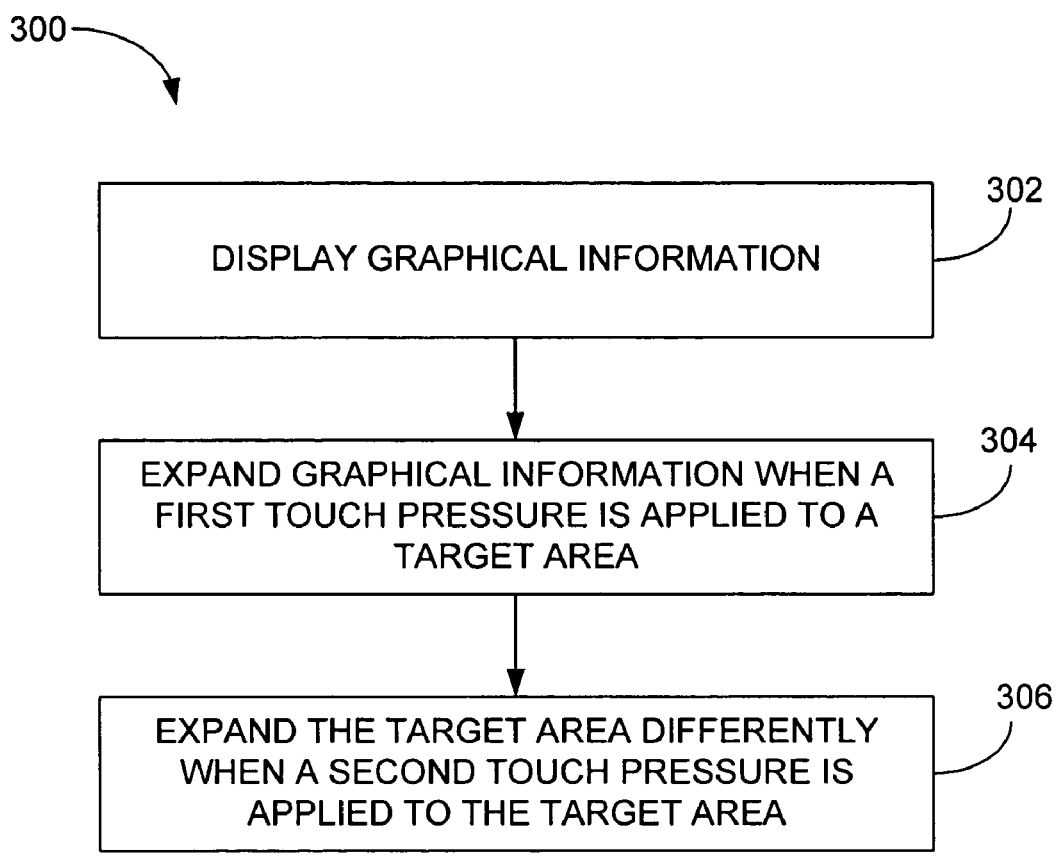
FIG. 8 is a touch based method, in accordance with another embodiment of the present invention.

FIG. 8 is a touch based method 300, in accordance with another embodiment of the present invention. The touch based method 300 may for example be performed on a touchscreen display. The method includes blocks 302, 304 and 306. In block 302, graphical information is displayed. In block 304, the graphical information is expanded when a first touch pressure is applied to a target area. In block 306, the expanded target area is expanded differently when a second touch pressure is applied to the target area. The second touch pressure generally occurs during a continuous touch, i.e., the first and second pressures occur in the same touch event (continuous contact with the touchscreen). By way of example, the size of expansion, the rate of expansion, the amount of magnification may all be based on the touch pressure. With regards to the size of expansion, the expanded portion may get larger with greater touch pressures and smaller with lower touch pressures. With regards to the rate of expansion, the expansion may grow faster with greater touch pressures or slower with lower touch pressures. With regards to magnification, the expanded area may magnify to larger values with greater touch pressures and lower values with lower touch pressures.

The method 300 may further include an additional block where the target area stays in the first expanded state when the touch is discontinued in the first expanded state or stays in the second expanded state when the touch is discontinued in the second expanded state.

Figure 9:
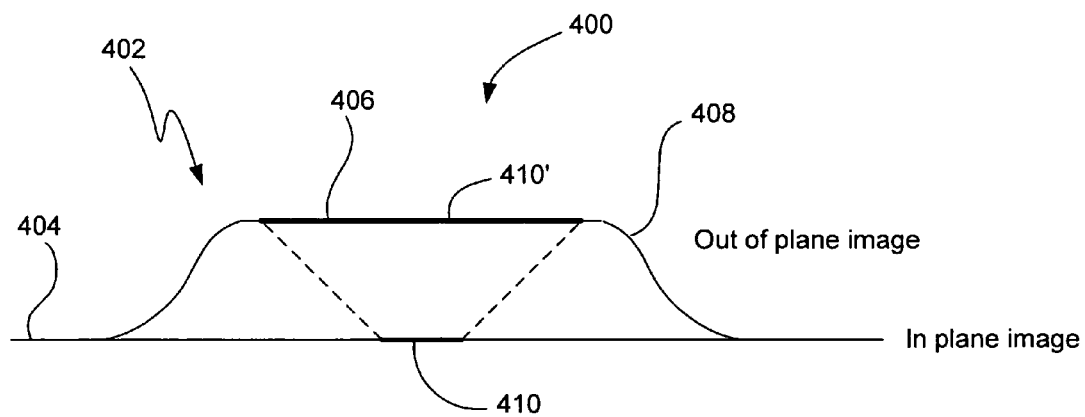
FIG. 9 is a side view showing a GUI in an unexpanded and expanded state, in accordance with one embodiment of the present invention.
Figure 10:
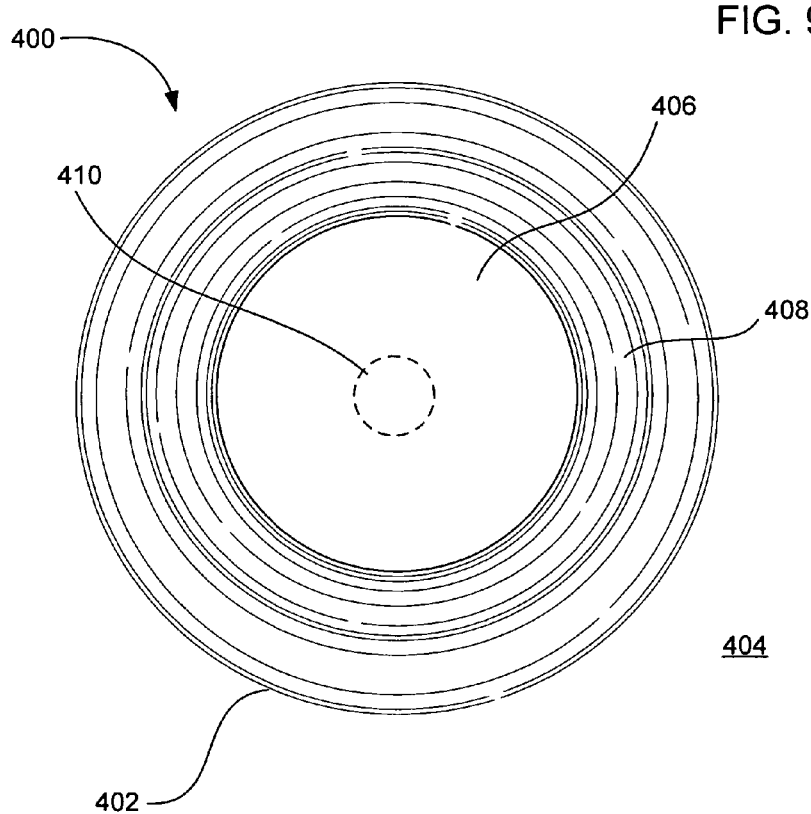
FIG. 10 is a top view showing a GUI in an unexpanded and expanded state, in accordance with one embodiment of the present invention.

FIGS. 9 and 10 are diagrams showing GUI 400 in an unexpanded and expanded state, in accordance with one embodiment of the present invention. FIG. 9 is a side view and FIG. 10 is a top view. As shown, the expanded portion 402 is enlarged, magnified and raised (e.g., pushed up) relative to the remaining portions 404 of the graphical information. Although the expanded portion appears to be out of plane relative to the remaining portions, it should be noted that the expanded portion is actually in plane with the remaining portions. Visual techniques are used to make it appear as if it is raised even though it is displayed in the same plane.

In the illustrated embodiment, the expanded portion includes a plateau region 406 and a transition region 408. The plateau region 406 is configured to display the target area 410 in a larger and magnified state. The transition region 408, on the other hand, is configured to compress the areas between the plateau region 406 and the remaining portions 404. The transition region 408 produces a slope or roll off at the edge of the plateau region 406. In fact, the transition region 408 may be a gradient of magnification between the remaining portions 404 and the plateau region 406. By way of example, when the plateau region 406 is magnified 3 times that of the target area 410, the magnification of the transition region 408 may slope from a magnification of 1 proximate the remaining portions 404 to a magnification of 3 proximate the plateau region 406. The size and slope of the transition region 408 may be widely varied. The size and slope may depend on the amount of virtual distortion that is desired or allowed. As should be appreciated, the greater the slope the greater the virtual distortion.

Figure 11:
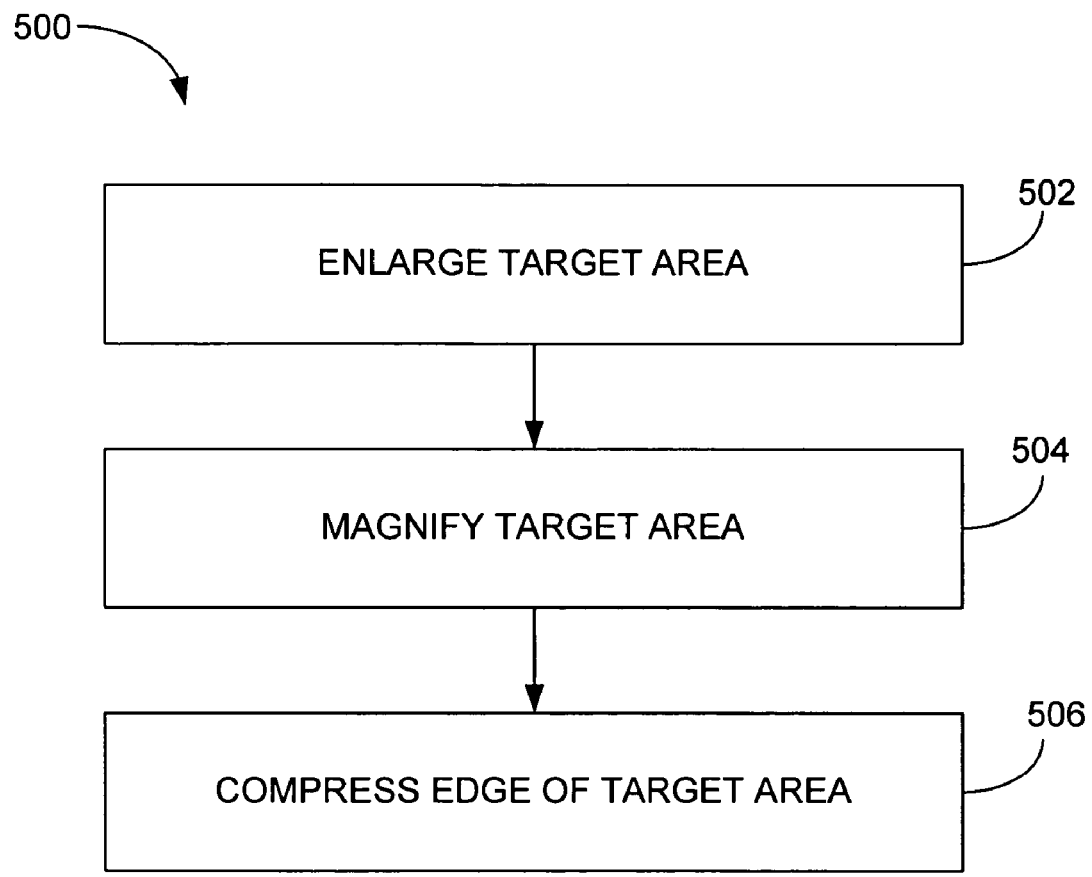
FIG. 11 is an expansion method, in accordance with one embodiment of the present invention.

FIG. 11 is an expansion method 500, in accordance with one embodiment of the present invention. The method 500 may for example correspond to any of the expansion steps mentioned herein. The method 500 includes block 502, 504 and 506. In block 502, the target area is enlarged. For example, the target area may be enlarged from a 3 mm×6 mm area to an area of about 6 mm×12 mm. In block 504, the target area is magnified. For example, the target area may be magnified 3× its normal state. In block 506, the outer edges of the target area are compressed to provide a smooth transition between the target area and the areas that are not targeted. The compressed area may include varying the magnification level between the enlarged target area and the non target areas that immediately surround the targeted area. The compressed area may be compressed in a topographical manner with each level representing a different magnification.

Figure 12A:
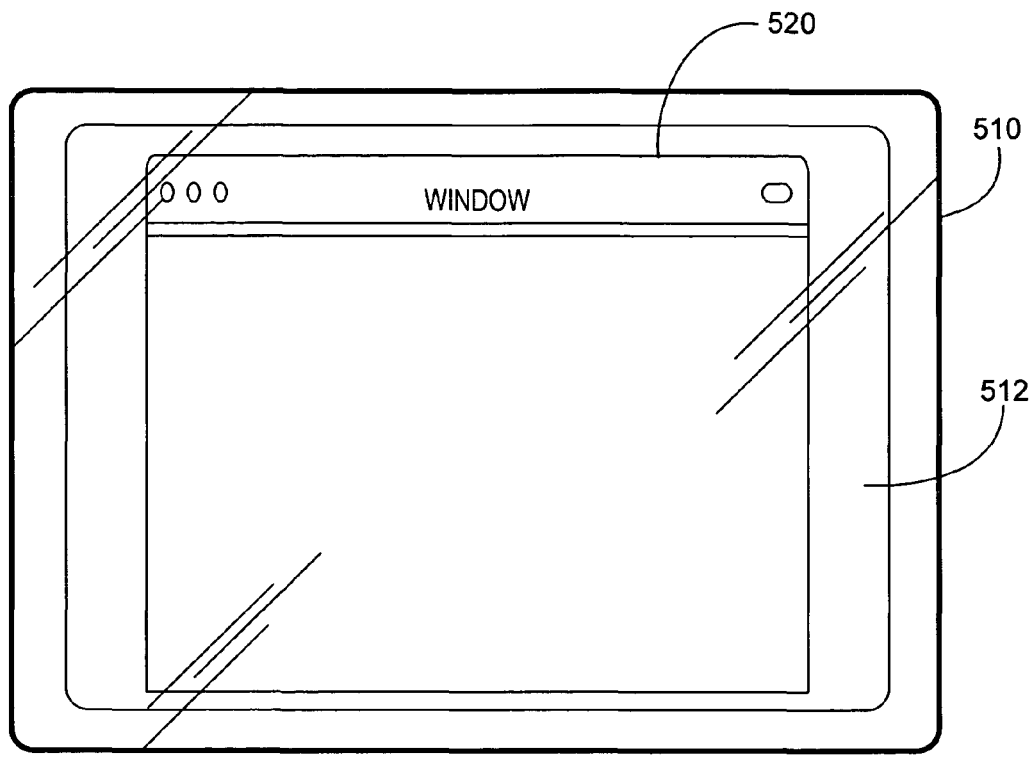
FIGS. 12A-12N illustrate an exemplary expansion sequence, in accordance with one embodiment of the present invention.
Figure 12B:
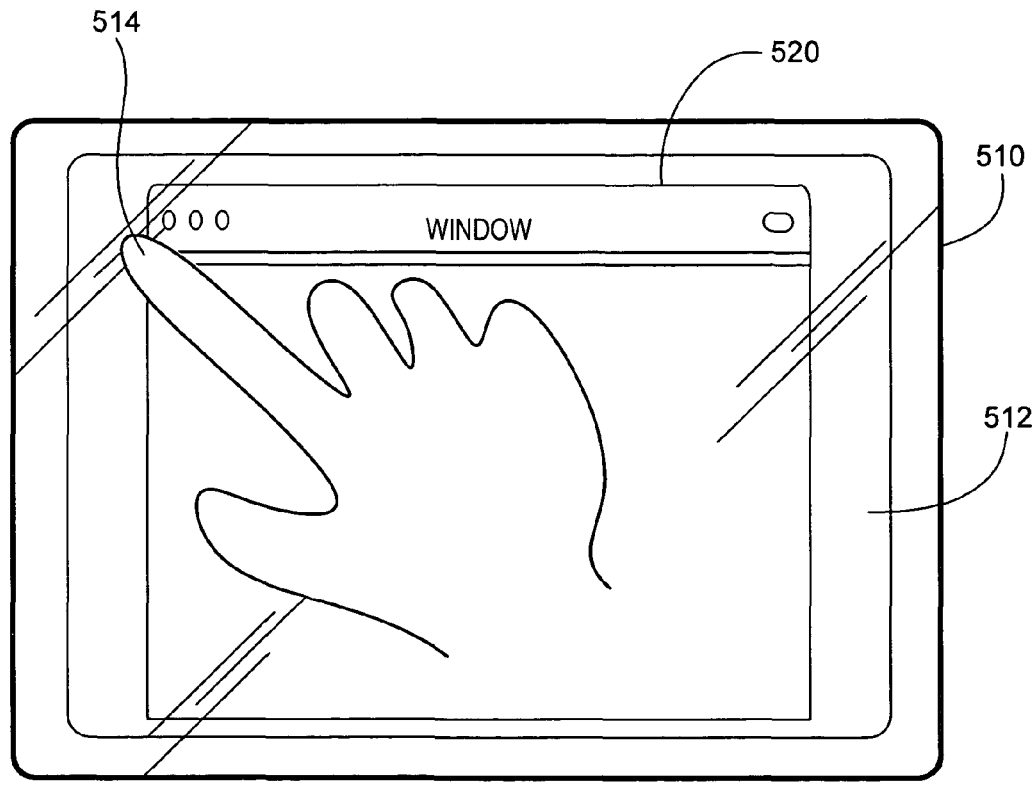
Figure 12C:
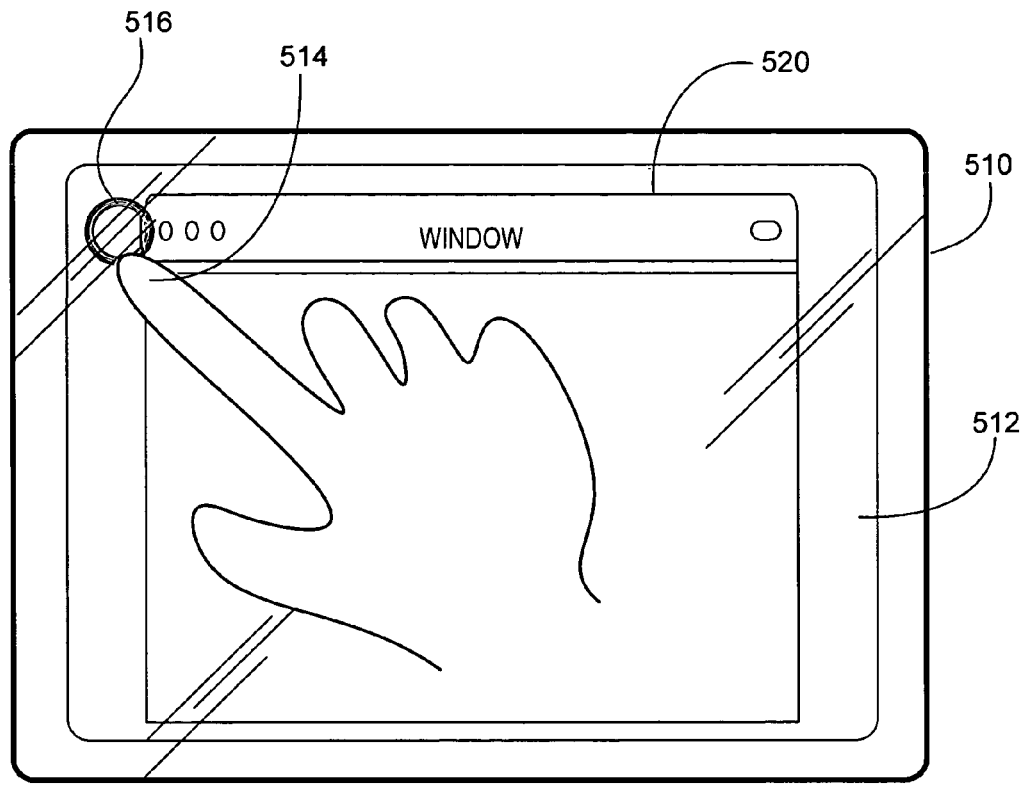
Figure 12D:
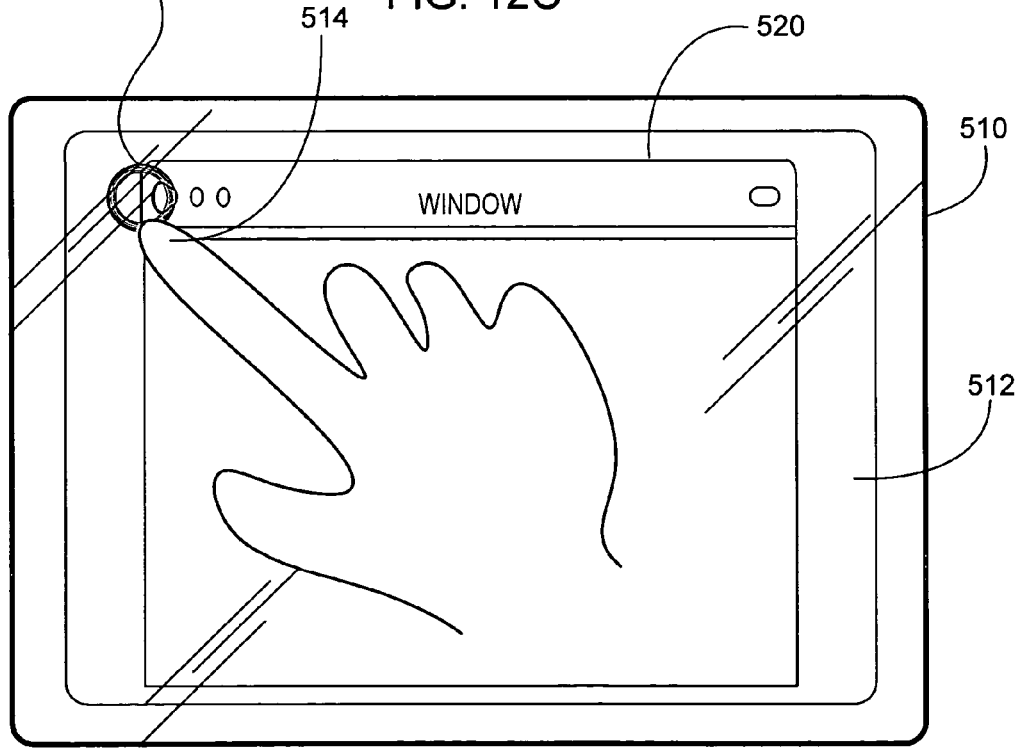
Figure 12E:
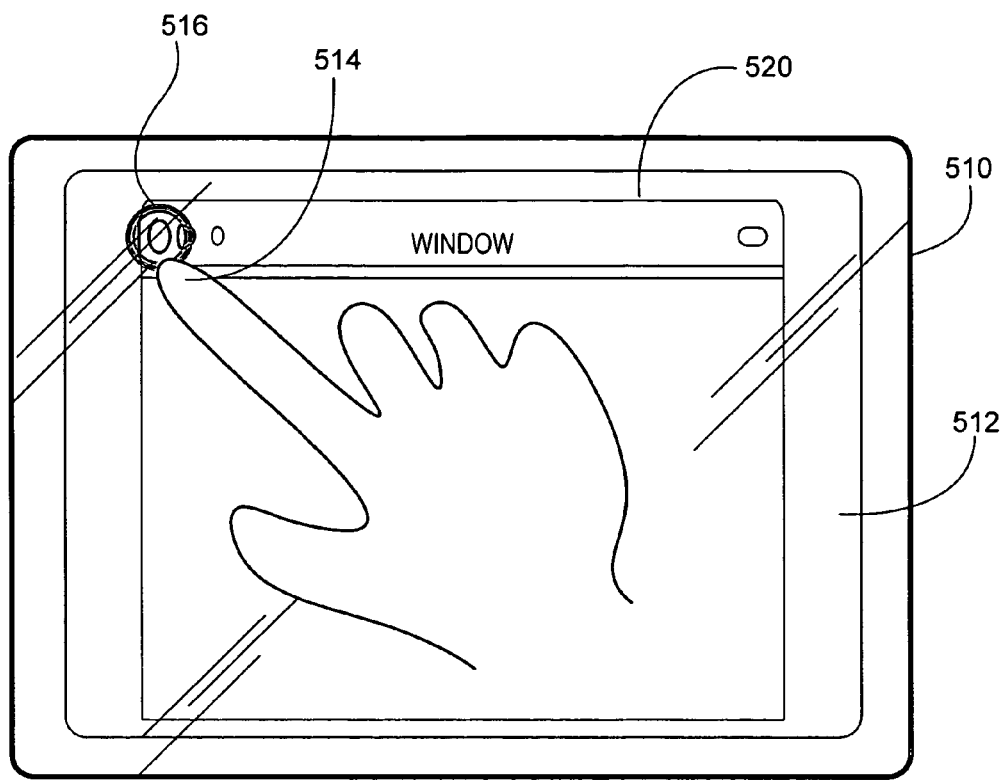
Figure 12F:
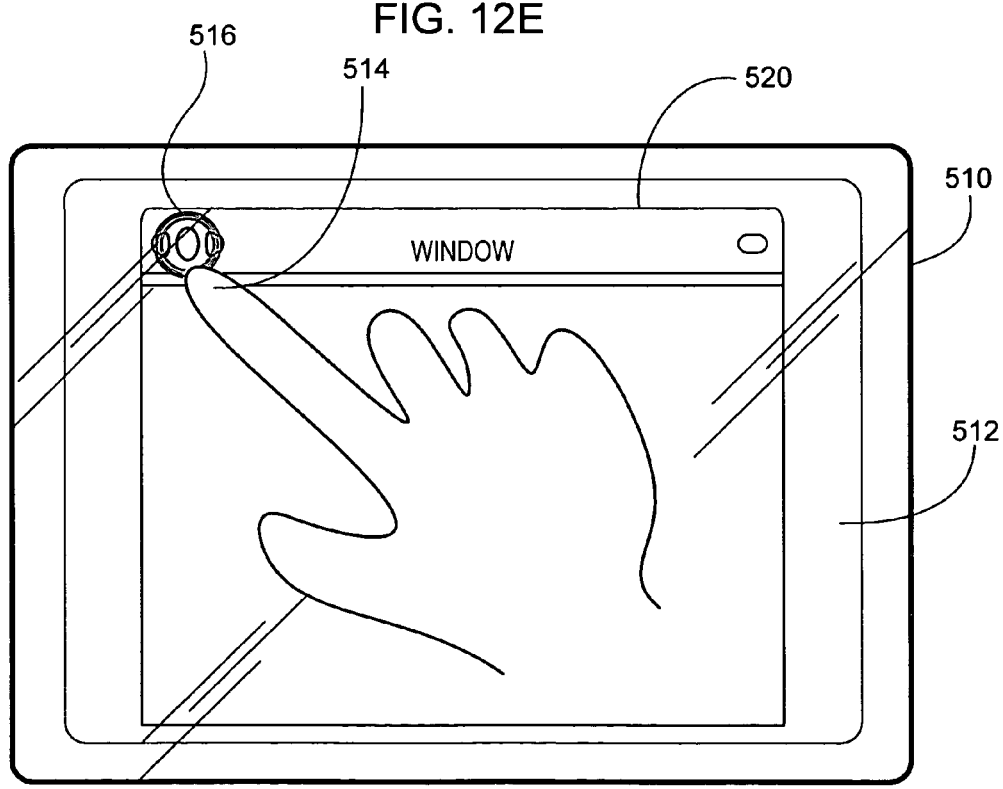
Figure 12G:
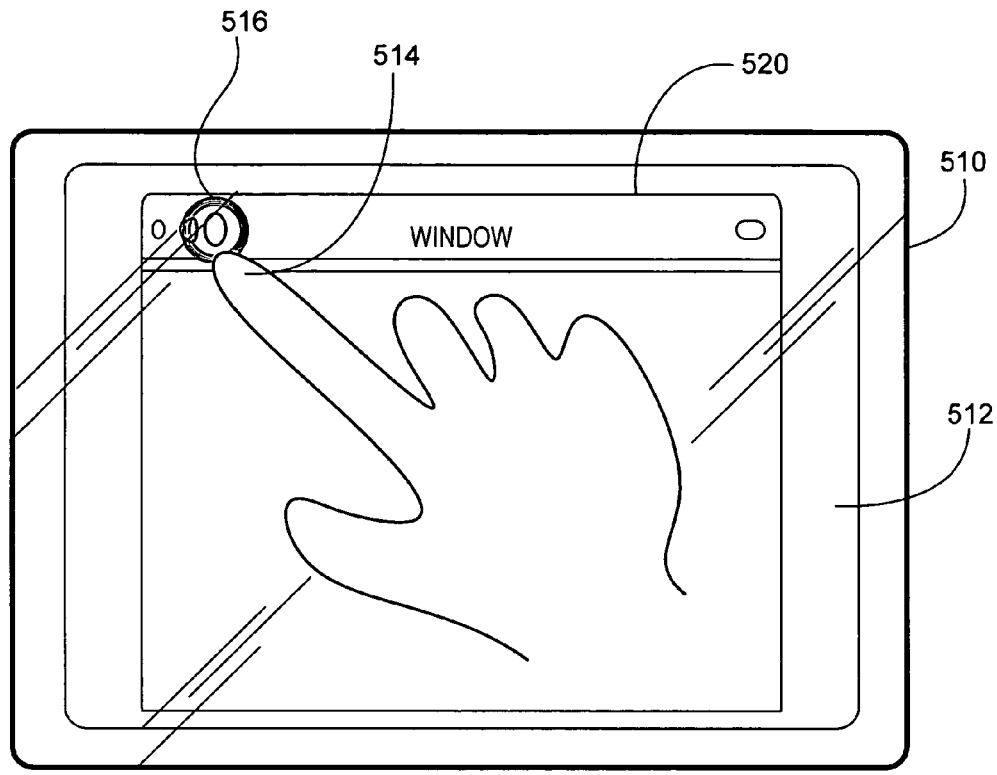
Figure 12H:
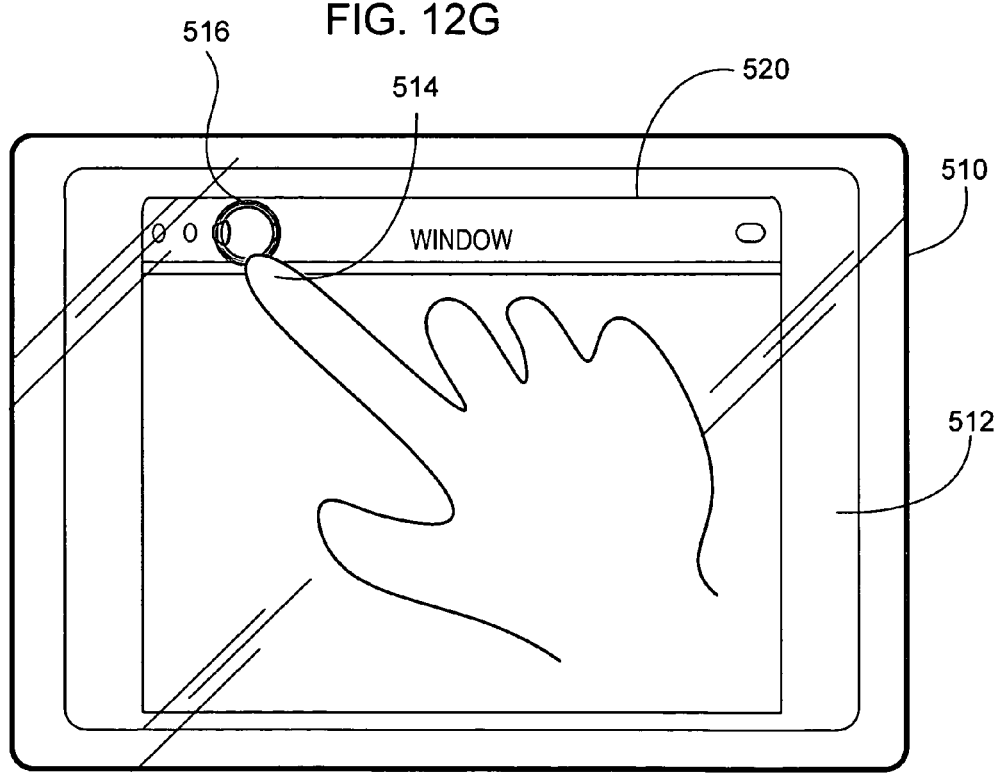
Figure 12I:
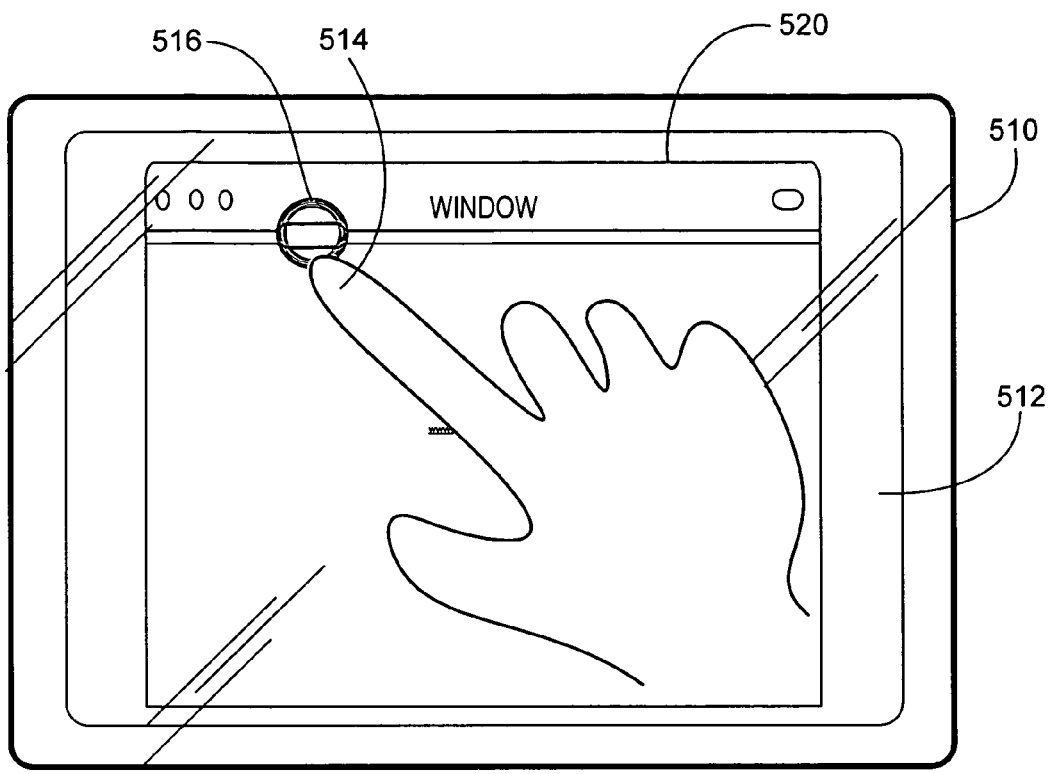
Figure 12J:
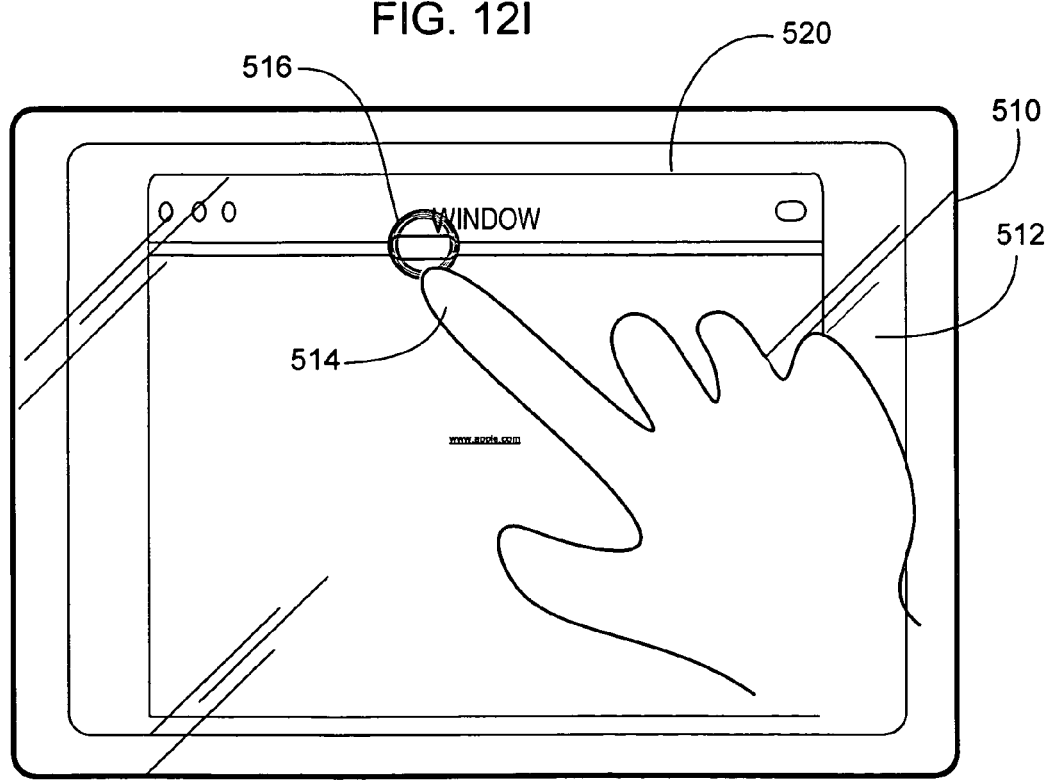
Figure 12K:
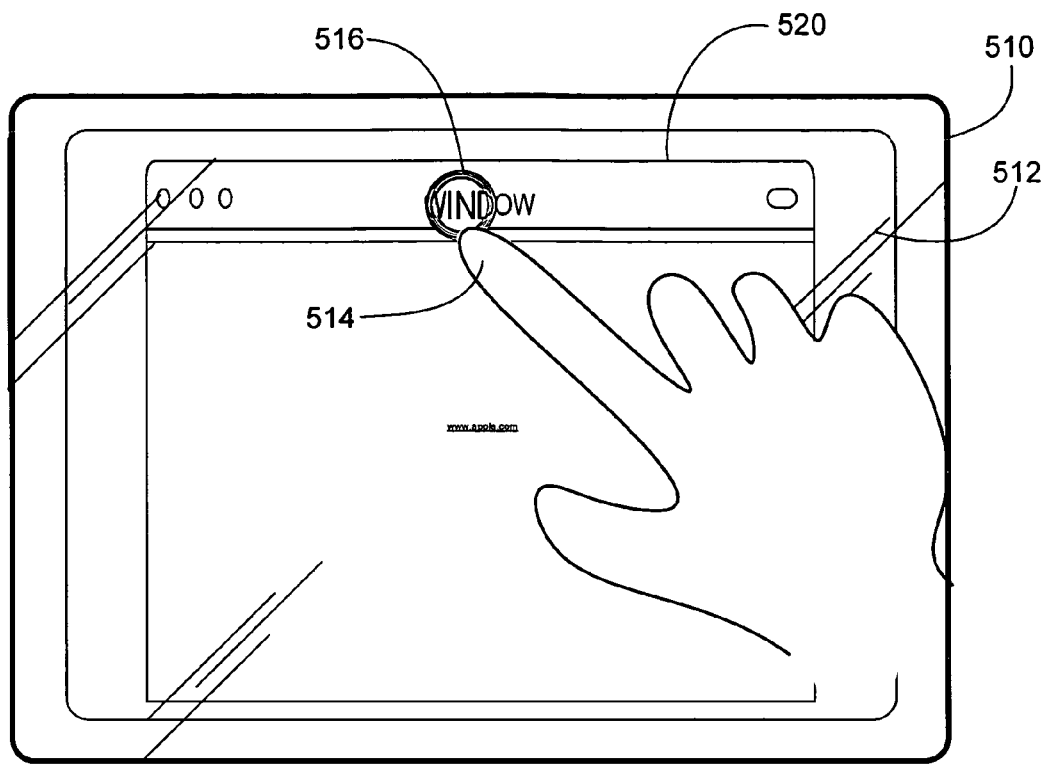
Figure 12L:
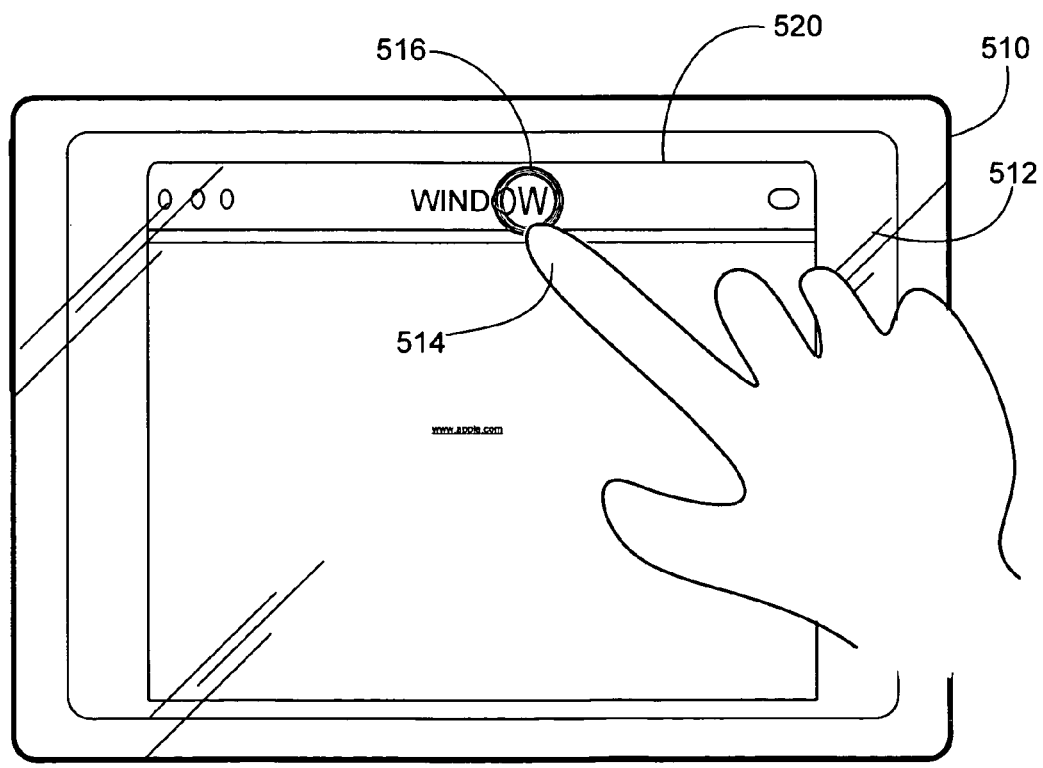
Figure 12M:
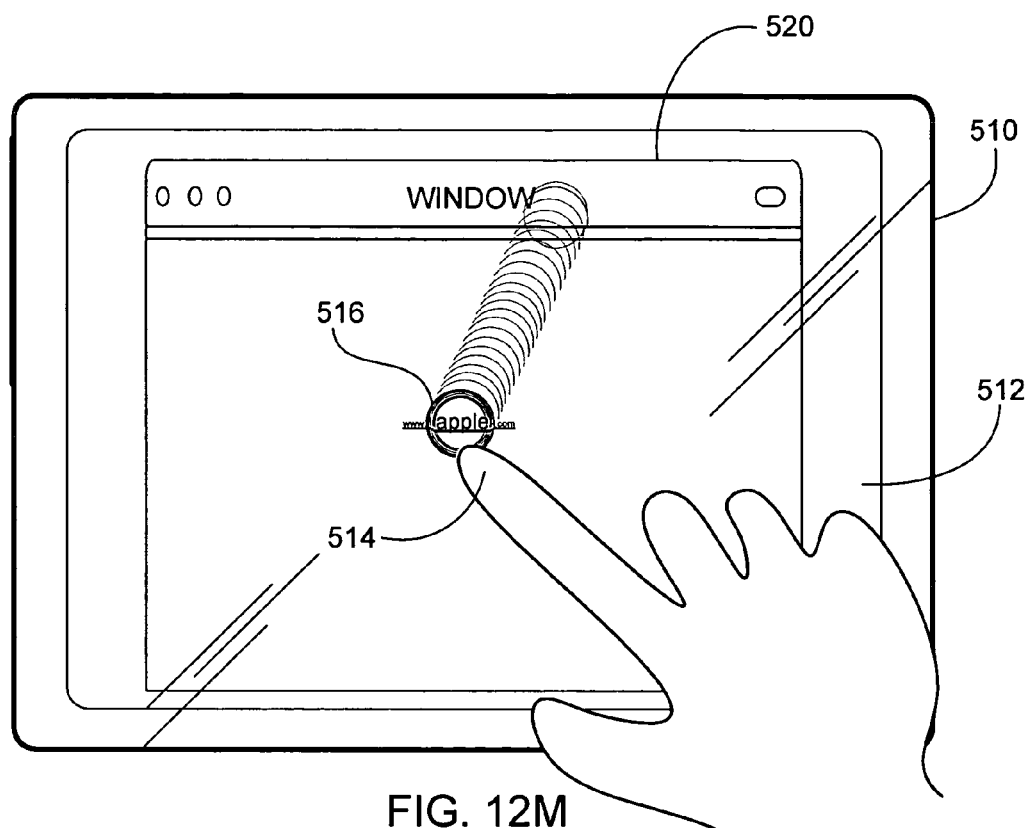
Figure 12N:
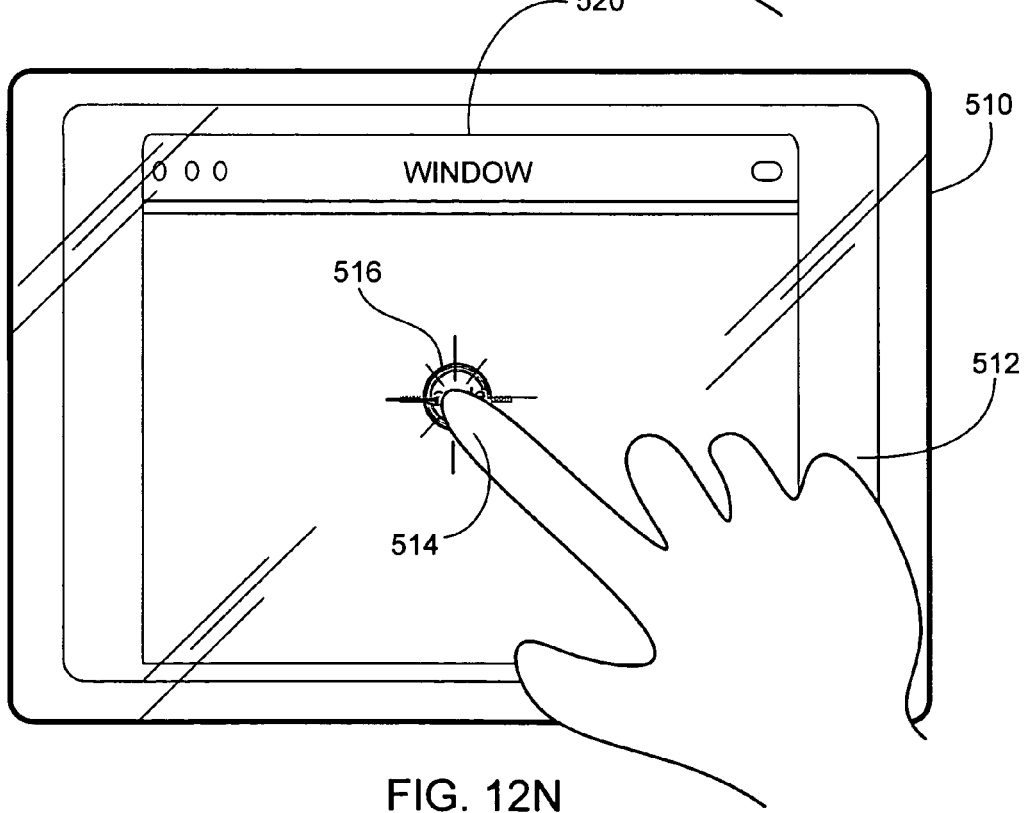

FIGS. 12A-12N illustrate an exemplary sequence using some of the techniques described above. This particular sequence shows for example expansion of a localized area as a finger is moved across the touchscreen of touchscreen display. As shown in FIG. 12A, a display portion of a touchscreen display 510 presents a GUI 512 to a user. As shown in FIG. 12B, the user places their finger 514 on the touchscreen portion of the touchscreen display 510 and over an area of the GUI 512. As shown in FIG. 12C, after the finger 514 dwells for some time over the GUI 512, a localized area 516 of the GUI 512 is expanded. In this particular illustration, the localized area 516 includes a plateau region and a transition region that is located between the plateau region and the remaining portions of the GUI. The targeted area in proximity to the finger is presented in an enlarged and magnified state within the plateau region while the remaining portions are not. Furthermore, the transition region compresses the graphical information between the plateau and the remaining portions. The compressing causes the plateau to appear raised relative to the remaining portions. The transition region generally provides gradient of magnification between the remaining portions and the plateau such that the information contained therein looks somewhat distorted or stretched.

As shown in FIG. 12D, as the finger 514 maintains contact and is moved to the right, the localized expanded area 516 moves with the finger 514. A different portion of the GUI 512 is therefore expanded. In this particular case, the edge of a window 520 comes into the center of the plate and a button is disposed partially in the plateau and partially in the transition region. In the illustrated sequence, the portions in the plateau are magnified at a constant level and the portions in the transition region are magnified in a descending manner. As shown in FIG. 12E, as the finger 514 continues to move, the first button is positioned within the center of the plateau and a second button is disposed partially in the plateau region and partially in the transition region. As shown in FIG. 12F, as the finger 514 continues to move, the second button is positioned within the center of the plateau and a first and third buttons are disposed partially in the plateau region and partially in the transition region. As shown in FIG. 12G, as the finger 514 continues to move, the third button is positioned within the center of the plateau and the second button is disposed partially in the plateau region and partially in the transition region. As shown in FIG. 12H, , as the finger 514 continues to move, the third button is disposed partially in the plateau region and partially in the transition region. It should be noted at this time that if the user had decided to select any of the buttons, they could have done so when the button was located within the plateau region. This may have been accomplished with increased touch pressure or by tapping the button.

As shown in FIG. 12I, as the finger 514 moves away from the buttons, it moves over an inside edge of the window 520 thereby causing the inside edge to be expanded. As shown in FIG. 12J, as the finger moves along the window 520, the window title comes into view. Similar to the buttons, the portions of the title in the plateau are fully enlarged and magnified while the portions in the transition region are distorted. As shown in FIGS. 12K and 12L, this effect is continues as the finger 514 moves across the title.

As shown in FIG. 12M, the finger 514 is moved from the title to a link positioned within the window 520. Similar to the buttons and title, the portions of the link in the plateau are fully enlarged and magnified while the portions in the transition region are distorted and further the portions outside the expansion are of normal size and magnification. As shown in FIG. 12N, the user exerts a greater pressure on the touchscreen while the link is in its expanded form. This increased pressure is recognized as a touch event, and the element associated with link is launched or opened (although not shown).

Figure 13A:
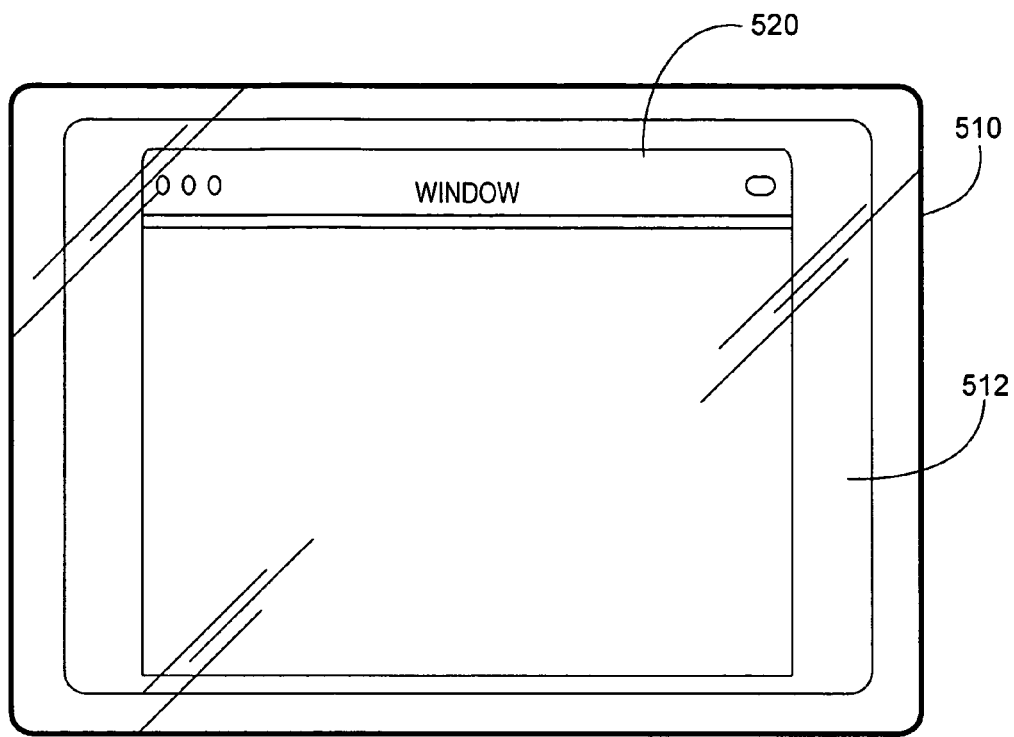
FIGS. 13A-13D illustrate an exemplary expansion sequence, in accordance with one embodiment of the present invention.
Figure 13B:
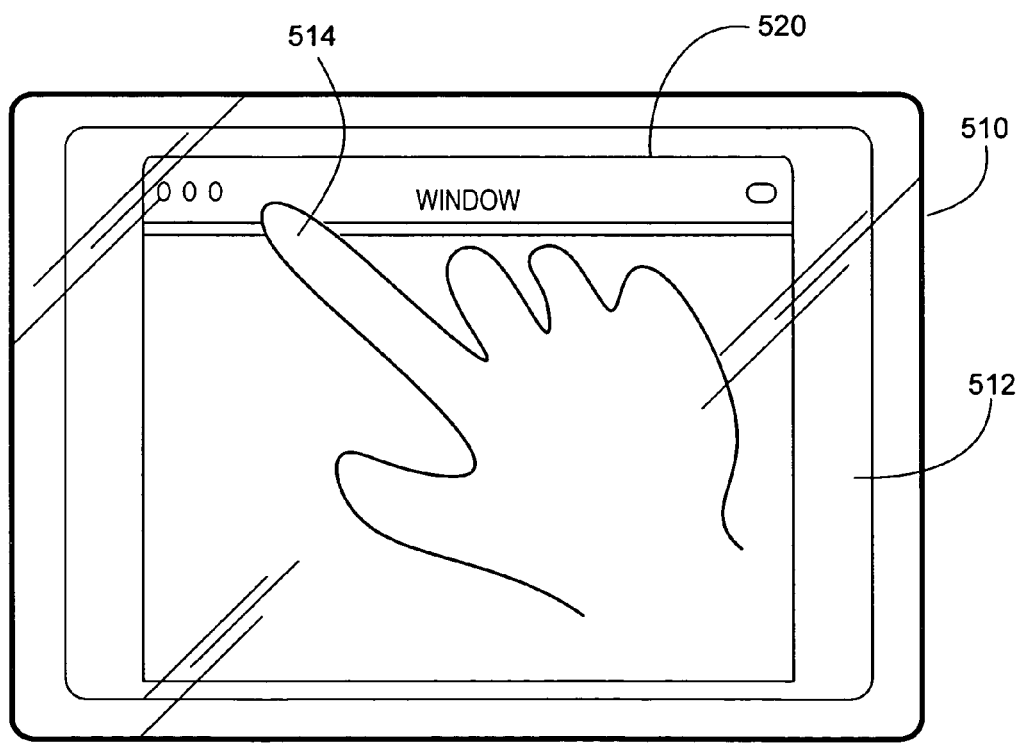
Figure 13C:
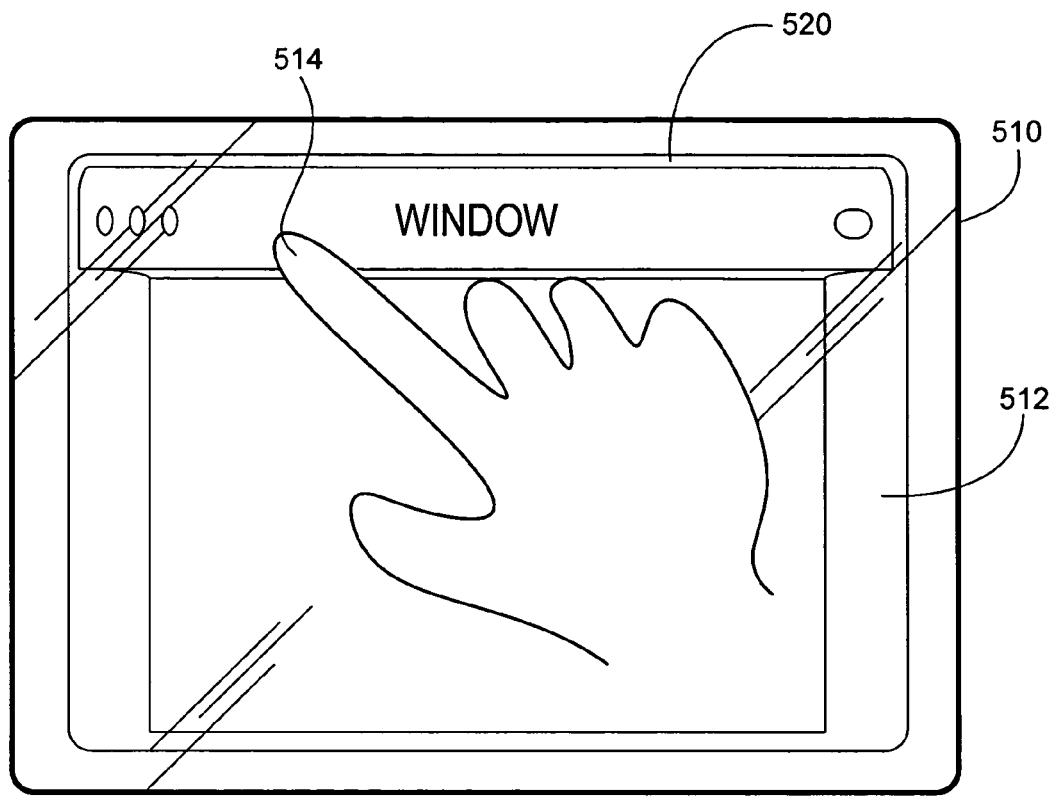
Figure 13D:
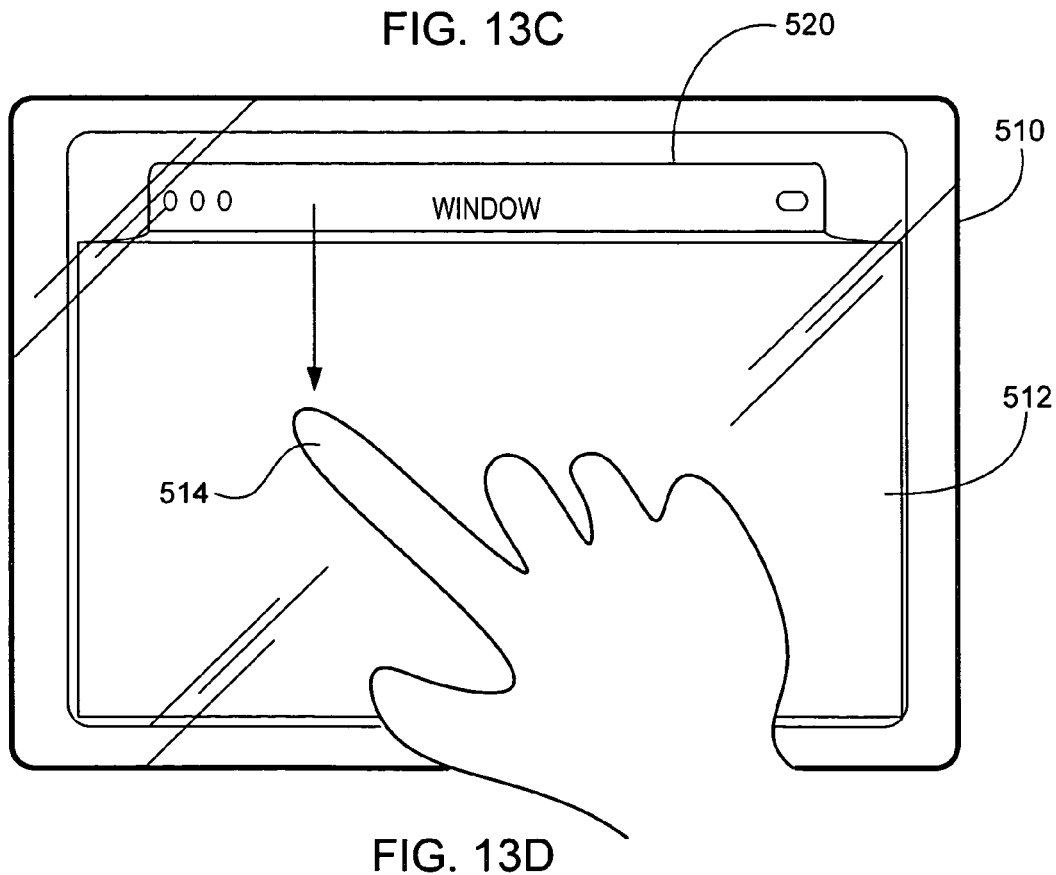

FIGS. 13A-13D illustrate an exemplary sequence using some of the techniques described above. This particular sequence shows for example expansion of different objects as a finger is moved across the touchscreen of touchscreen display. As shown in FIG. 13A, a display portion of a touchscreen display 510 presents a GUI 512 to a user. As shown in FIG. 13B, the user places their finger 514 on the touchscreen portion of the touchscreen display 510 and over an area of the GUI 512. In this particular case, the finger 514 is placed over the heading portion of the window 520. As shown in FIG. 13C, after the finger 514 dwells for some time over the heading, the heading is expanded. In this illustration, the heading is presented in an enlarged and magnified state while the remaining portions are not. As shown in FIG. 13D, when the finger 514 maintains contact with the touchscreen and is moved over a different GUI object as for example the field of the window, the field is expanded. In this illustration, the field is presented in an enlarged and magnified state while the remaining portions are not (including the heading).

Figure 14:
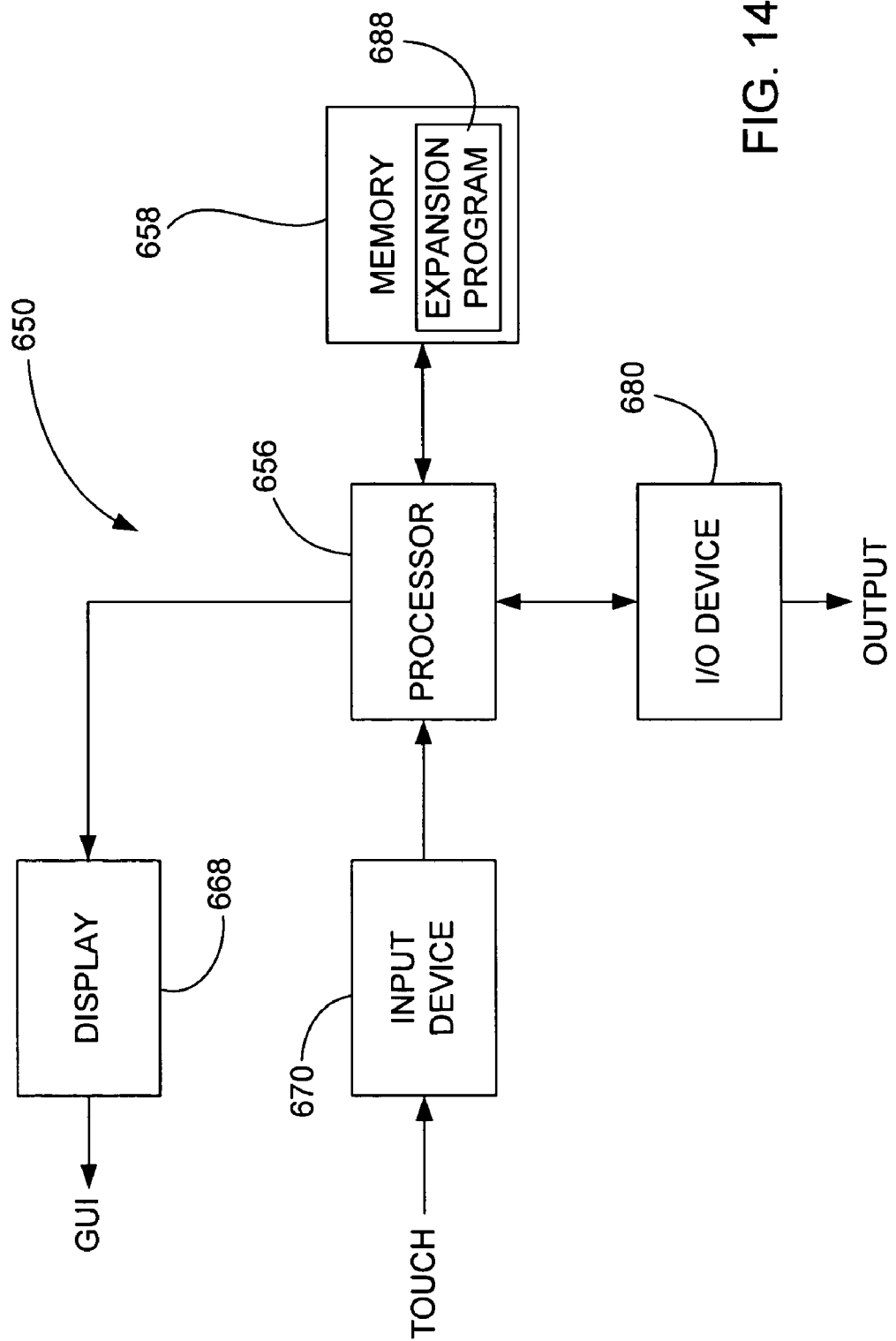
FIG. 14 is a block diagram of a computer system, in accordance with one embodiment of the present invention.

FIG. 14 is a block diagram of an exemplary computer system 650, in accordance with one embodiment of the present invention. The computer system 650 may correspond to a personal computer, such as a desktop, laptop, tablet or handheld computer. The computer system may also correspond to other types of computing devices such as a cell phones, PDAs, media players, consumer electronic devices, and/or the like.

The exemplary computer system 650 shown in FIG. 14 includes a processor 656 configured to execute instructions and to carry out operations associated with the computer system 650. For example, using instructions retrieved for example from memory, the processor 656 may control the reception and manipulation of input and output data between components of the computing system 650. The processor 656 can be implemented on a single-chip, multiple chips or multiple electrical components. For example, various architectures can be used for the processor 656, including dedicated or embedded processor, single purpose processor, controller, ASIC, and so forth.

In most cases, the processor 656 together with an operating system operates to execute computer code and produce and use data. By way of example, the operating system may correspond to Mac OS, OS/2, DOS, Unix, Linux, Palm OS, and the like. The operating system can also be a special purpose operating system, such as may be used for limited purpose appliance-type computing devices. The operating system, other computer code and data may reside within a memory block 658 that is operatively coupled to the processor 656. Memory block 658 generally provides a place to store computer code and data that are used by the computer system 650. By way of example, the memory block 658 may include Read-Only Memory (ROM), Random-Access Memory (RAM), hard disk drive and/or the like. The information could also reside on a removable storage medium and loaded or installed onto the computer system 650 when needed. Removable storage media include, for example, CD-ROM, PC-CARD, memory card, floppy disk, magnetic tape, and a network component.

The computer system 650 also includes a display device 668 that is operatively coupled to the processor 656. The display device 668 may be a liquid crystal display (LCD) (e.g., active matrix, passive matrix and the like). Alternatively, the display device 668 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks.

The display device 668 is generally configured to display a graphical user interface (GUI) that provides an easy to use interface between a user of the computer system and the operating system or application running thereon. Generally speaking, the GUI represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI can additionally or alternatively display information, such as non interactive text and graphics, for the user on the display device 668.

The computer system 650 also includes an input device 670 that is operatively coupled to the processor 656. The input device 670 is configured to transfer data from the outside world into the computer system 650. The input device 670 may include a touch sensing device configured to receive input from a user's touch and to send this information to the processor 656. In many cases, the touch-sensing device recognizes touches, as well as the position and magnitude of touches on a touch sensitive surface. The touch sensing means reports the touches to the processor 656 and the processor 656 interprets the touches in accordance with its programming. For example, the processor 656 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like. Furthermore, the touch sensing means may be based on single point sensing or multipoint sensing. Single point sensing is capable of only distinguishing a single touch, while multipoint sensing is capable of distinguishing multiple touches that occur at the same time.

In the illustrated embodiment, the input device 670 is a touch screen that is positioned over or in front of the display 668. The touch screen 670 may be integrated with the display device 668 or it may be a separate component. The touch screen 670 has several advantages over other input technologies such as touchpads, mice, etc. For one, the touch screen 670 is positioned in front of the display 68 and therefore the user can manipulate the GUI directly. For example, the user can simply place their finger over an object to be selected, activated, controlled, etc. In touch pads, there is no one-to-one relationship such as this. With touchpads, the touchpad is placed away from the display typically in a different plane. For example, the display is typically located in a vertical plane and the touchpad is typically located in a horizontal plane. This makes its use less intuitive, and therefore more difficult when compared to touch screens.

The touchscreen can be a single point or multipoint touchscreen. Multipoint input devices have advantages over conventional single point devices in that they can distinguish more than one object (finger) simultaneously. Single point devices are simply incapable of distinguishing multiple objects at the same time. By way of example, a multipoint touch screen, which can be used herein, is shown and described in greater detail in copending and commonly assigned U.S. patent application Ser. No. 10/840,862, which is hereby incorporated herein by reference.

The computer system 650 also includes capabilities for coupling to one or more I/O devices 680. By way of example, the I/O devices 680 may correspond to keyboards, printers, scanners, cameras, speakers, and/or the like. The I/O devices 680 may be integrated with the computer system 650 or they may be separate components (e.g., peripheral devices). In some cases, the I/O devices 680 may be connected to the computer system 650 through wired connections (e.g., cables/ports). In other cases, the I/O devices 680 may be connected to the computer system 650 through wireless connections. By way of example, the data link may correspond to PS/2, USB, IR, RF, Bluetooth or the like.

In accordance with one embodiment of the present invention, the memory block 658 includes an expansion program 688 for controlling the expansion of the touchscreen display 668/670, particularly both the image and input level of the touchscreen display. By way of example, the expansion methodology shown and described in the previous figures may be utilized by the expansion program. In one embodiment, the expansion program is integrated with or part of the operating system. The expansion therefore can be implemented in any of the displayed pages operating under the control of the operating system (e.g., system pages, webpages, application pages, etc.). Alternatively, the expansion program may be part of a separate application.

The expansion program 688 may include an expansion database that stores the expansion characteristics. The expansion characteristics generally refer to how the system is to be expanded, i.e., the expansion program refers to the expansion characteristics when implementing expansion. The expansion characteristics may include for example magnification levels, the size and shape of the expanded area, the slope of the transition area, rate of expansion, the latency time before the expanded area returns to normal state, the dwell time before the expansion is implemented, touch pressure, tapping speed, hovering time, etc. The expansion characteristics stored in the database may be accessed by a user through an expansion control menu, which may be viewed on a display screen as part of the GUI. The expansion control menu may include expansion control settings pertaining to the expansion characteristics. In fact, the expansion control menu may serve as a control panel for reviewing and/or customizing the expansion control settings, i.e., the user may quickly and conveniently review the expansion control settings and make changes thereto. Once the user saves the changes, the modified expansion control settings will be employed to handle future expansion. Furthermore, it may be possible for the user to disable the expansion feature so that the system can revert to a more conventional one.

Figure 15:
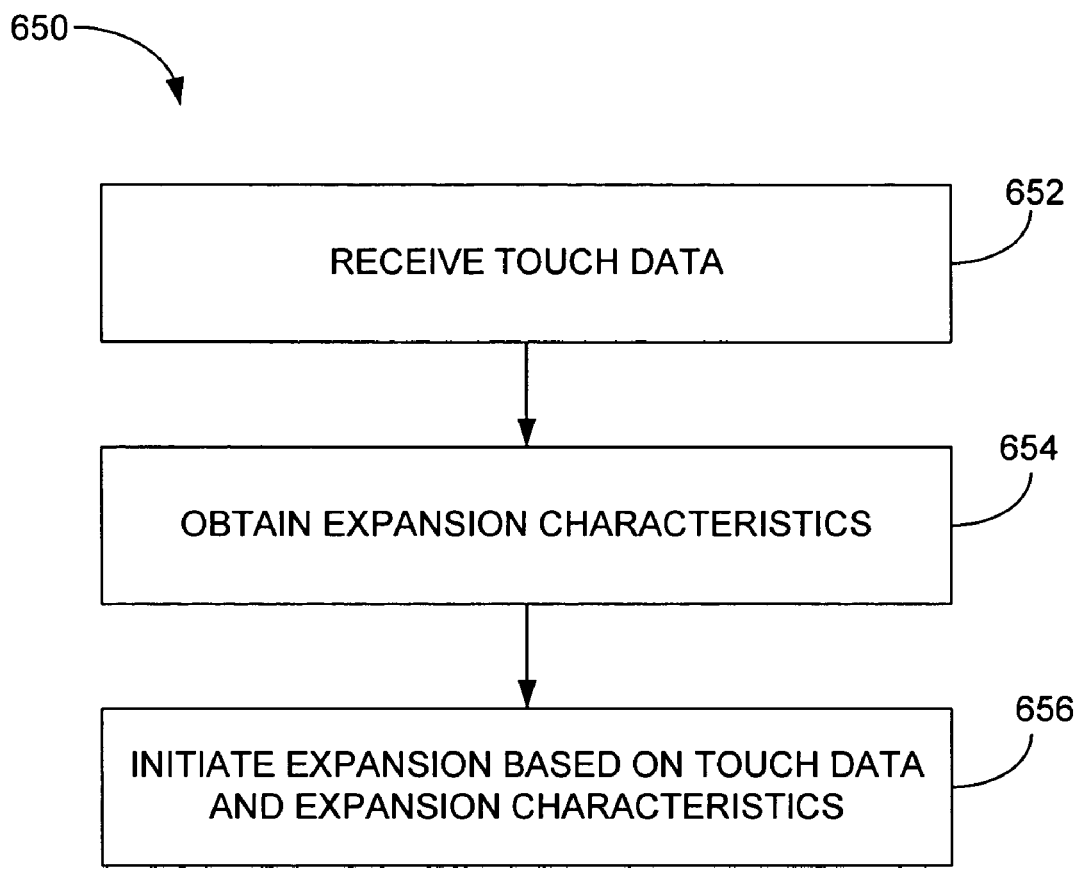
FIG. 15 is a flow diagram of expansion processing, in accordance with one embodiment of the invention.

FIG. 15 is a flow diagram of expansion processing 650, in accordance with one embodiment of the invention. Expansion processing 650 may be performed via a computing device such as the one described in FIG. 14 in order to provide a touch screen display with an expansion effect. Expansion processing 650 generally begins at block 652 where touch data is received. The touch data may for example be received from a touchscreen. After block 652, the process proceeds to block 654 where expansion characteristics are obtained. The expansion characteristics may for example be stored in a database of the computing device. Expansion characteristics generally refer to when and how an expansion effect is implemented. The expansion characteristics may for example include whether or not the expansion feature is activated, the touch configuration needed to initiate expansion (e.g., duration), the location, size, magnification level and shape of the expansion, the slope of the transition, the rate of expansion, whether the expansion follows motion, and the like. The expansion characteristics may also identify a type and nature of expansion that is to be provided for a specific touch data. For example, at this touch pressure, the expansion effect follows this rate of expansion. After block 654, the process proceeds to block 656 where expansion is initiated based on the touch data and the expansion characteristics. By way of example, the display may be instructed to visually expand a targeted area while keeping the other areas unexpanded, and further to scale the input sensitivity with the visual expansion. The manner in which this happens depends on the touch data (location, duration, pressure, etc.) and the expansion characteristics that are selected at the time of expansion processing.

The various aspects of the expansion processing described above can be used alone or in various combinations. The expansion processing is preferably implemented by a combination of hardware and software, but can also be implemented in hardware or software. The expansion processing can also be embodied as computer readable code on a computer readable medium. The computer readable medium is any data storage device that can store data, which can thereafter be read by a computer system.

While this invention has been described in terms of several preferred embodiments, there are alterations, permutations, and equivalents, which fall within the scope of this invention. For example, although the invention is primarily directed at touch screens, other sensing devices that do not require touches may be used. By way of example, sensors that can detect the proximity of an object to a surface even when the object is not in contact with the surface may be used (e.g., proximity sensors). It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method comprising:
   at a computing device with a touchscreen display:
   presenting graphical information on the touchscreen display;
   detecting a finger touch at a location on the touchscreen display, the finger touch comprising a first contact area on the touch screen display, wherein the first contact area has a size;
   in response to detecting the finger touch, expanding a localized area of the graphical information on the touchscreen display to a first fixed size, wherein:
   the expanded localized area is proximate the location of the finger touch,
   the expanded localized area includes a plateau region that displays a magnified portion of the graphical information at a constant magnification level, and
   expanding the localized area of the graphical information on the touchscreen display to the first fixed size occurs at a speed based on the size of the first contact area; and, while continuing to detect the finger touch on the touchscreen display:
    detecting a movement of the finger touch over the touchscreen display; and,
    in response to detecting the movement, continuously changing a respective location of the expanded localized area to follow the movement of the finger touch.

2. The method as recited in claim 1, wherein the speed of expansion increases as the size of the first contact area increases.

3. The method as recited in claim 1, wherein the expanded localized area is offset from the respective location of the touch.

4. A method, comprising:
at a computing device with a touchscreen display:
    presenting graphical information on the touchscreen display;
    detecting a finger touch at a location on the touchscreen display, the finger touch comprising a contact area on the touch screen display;
    in response to detecting the finger touch, expanding a localized area of the graphical information on the touchscreen display to a first fixed size, wherein:
        the expanded localized area is proximate the location of the finger touch, and
        the expanded localized area includes a plateau region that displays a magnified portion of the graphical information at a constant magnification level; and,
    while continuing to detect the finger touch on the touchscreen display:
        detecting a movement of the finger touch over the touchscreen display;
        in response to detecting the movement, continuously changing a respective location of the expanded localized area to follow the movement of the finger touch; and,
    while displaying a feature within the expanded localized area:
        detecting a first size of the contact area of the finger touch,
        after detecting the first size of the contact area of the finger touch, detecting a second size of the contact area of the finger touch, wherein the second size of the contact area is greater than the first size of the contact area, and wherein the first contact area is contained within the second contact area; and,
        in response to detecting the second size of the contact area, activating the feature located within the expanded localized area.

5. The method as recited in claim 4, wherein the expanded localized area is offset from the respective location of the touch.

6. A computer readable storage medium storing one or more programs, the one or more programs comprising instructions, which when executed by a computing device with a touchscreen display, cause the device to:
    present graphical information on the touchscreen display;
    detect a finger touch at a location on the touchscreen display, the finger touch comprising a first contact area on the touch screen display, wherein the first contact area has a size;
    in response to detecting the finger touch, expand a localized area of the graphical information on the touchscreen display to a first fixed size, wherein:
        the expanded localized area is proximate the location of the finger touch,
        the expanded localized area includes a plateau region that displays a magnified portion of the graphical information at a constant magnification level, and
        expanding the localized area of the graphical information on the touchscreen display to the first fixed size occurs at a speed based on the size of the first contact area; and,
    while continuing to detect the finger touch on the touchscreen display:
        detect a movement of the finger touch over the touchscreen display; and,
        in response to detecting the movement, continuously change a respective location of the expanded localized area to follow the movement of the finger touch.

7. The computer readable storage medium of claim 6, wherein the speed of expansion increases as the size of the first contact area increases.

8. The compute readable storage medium of claim 6, wherein the expanded localized area is offset from the respective location of the touch.

9. A computing device, comprising:
a touchscreen display;
one or more processors;
memory; and
one or more programs, wherein the one or more programs are stored in the memory and configured to be executed by the one or more processors, the one or more programs including instructions for:
    presenting graphical information on the touchscreen display;
    detecting a finger touch at a location on the touchscreen display, the finger touch comprising a first contact area on the touch screen display, wherein the first contact area has a size;
    expanding a localized area of the graphical information on the touchscreen display to a first fixed size in response to detecting the finger touch, wherein:
        the expanded localized area is proximate the location of the finger touch,
        the expanded localized area includes a plateau region that displays a magnified portion of the graphical information at a constant magnification level, and
        expanding the localized area of the graphical information on the touchscreen display to the first fixed size occurs at a speed based on the size of the first contact area; and,
    while continuing to detect the finger touch on the touchscreen display:
        detecting a movement of the finger touch over the touchscreen display; and,
        in response to detecting the movement, continuously changing a respective location of the expanded localized area to follow the movement of the finger touch.

10. The computing device of claim 9, wherein the speed of expansion increases as the size of the first contact area increases.

11. The computing device of claim 9, wherein the expanded localized area is offset from the respective location of the touch.

12. A computer readable storage medium storing one or more programs, the one or more programs comprising instructions, which when executed by a computing device with a touchscreen display, cause the device to:
    present graphical information on the touchscreen display;

detect a finger touch at a location on the touchscreen display, the finger touch comprising a contact area on the touch screen display;
in response to detecting the finger touch, expand a localized area of the graphical information on the touchscreen display to a first fixed size, wherein:
the expanded localized area is proximate the location of the finger touch, and
the expanded localized area includes a plateau region that displays a magnified portion of the graphical information at a constant magnification level; and,
while continuing to detect the finger touch on the touchscreen display:
detect a movement of the finger touch over the touchscreen display;
in response to detecting the movement, continuously change a respective location of the expanded localized area to follow the movement of the finger touch; and,
while displaying a feature within the expanded localized area:
detect a first size of the contact area of the finger touch,
after detecting the first size of the contact area of the finger touch, detect a second size of the contact area of the finger touch, wherein the second size of the contact area is greater than the first size of the contact area, and wherein the first contact area is contained within the second contact area; and,
in response to detecting the second size of the contact area, activate the feature located within the expanded localized area.

13. The computer readable storage medium of claim 12, wherein the expanded localized area is offset from the respective location of the touch.

14. A computing device, comprising:
a touchscreen display;
one or more processors;
memory; and
one or more programs, wherein the one or more programs are stored in the memory and configured to be executed by the one or more processors, the one or more programs including instructions for:
presenting graphical information on a touchscreen display;
detecting a finger touch at a location on the touchscreen display, the finger touch comprising a contact area on the touch screen display;
expanding a localized area of the graphical information on the touchscreen display to a first fixed size in response to detecting the finger touch, wherein:
the expanded localized area is proximate the location of the finger touch, and
the expanded localized area includes a plateau region that displays a magnified portion of the graphical information at a constant magnification level; and,
while continuing to detect the finger touch on the touchscreen display:
detecting a movement of the finger touch over the touchscreen display;
in response to detecting the movement, continuously changing a respective location of the expanded localized area to follow the movement of the finger touch; and,
while displaying a feature within the expanded localized area:
detecting a first size of the contact area of the finger touch,
after detecting the first size of the contact area of the finger touch, detecting a second size of the contact area of the finger touch, wherein the second size of the contact area is greater than the first size of the contact area, and wherein the first contact area is contained within the second contact area; and,
in response to detecting the second size of the contact area, activating the feature located within the expanded localized area.

15. The computing device of claim 14, wherein the expanded localized area is offset from the respective location of the touch.

* * * * *

UNITED STATES PATENT AND TRADEMARK OFFICE
CERTIFICATE OF CORRECTION

PATENT NO. : 7,760,187 B2  Page 1 of 1
APPLICATION NO. : 10/927925
DATED : July 20, 2010
INVENTOR(S) : Peter Kennedy It is certified that error appears in the above-identified patent and that said Letters Patent is hereby corrected as shown below:

Title page 2, in column 2, under "Other Publications", line 3, delete "Ali" and insert -- Ai --, therefor.

Title page 2, in column 2, under "Other Publications", line 3, delete "Xoom" and insert -- Zoom --, therefor.

In column 4, line 16, after "graphics" insert -- . --.

In column 12, line 49, delete "FIG. 12H ," and insert -- FIG. 12H, --, therefor.

Signed and Sealed this
Eighth Day of November, 2011

David J. Kappos
*Director of the United States Patent and Trademark Office*